US006843266B2

(12) United States Patent
Hope et al.

(10) Patent No.: US 6,843,266 B2
(45) Date of Patent: Jan. 18, 2005

(54) REGULATOR WITH EROSION RESISTANT SEAL ASSEMBLIES

(75) Inventors: Rodney C. Hope, Sugar Land, TX (US); Thomas B. Thrash, Jr., Houston, TX (US); Dennis S. Norton, Spring, TX (US)

(73) Assignee: Gilmore Valve Co., Ltd., Houston, TX (US)

( * ) Notice: Subject to any disclaimer, the term of this patent is extended or adjusted under 35 U.S.C. 154(b) by 0 days.

(21) Appl. No.: 10/249,336

(22) Filed: Apr. 1, 2003

(65) Prior Publication Data

US 2003/0131884 A1 Jul. 17, 2003

Related U.S. Application Data

(63) Continuation-in-part of application No. 09/640,401, filed on Aug. 16, 2000, now Pat. No. 6,568,418.

(51) Int. Cl.[7] .............................................. G05D 16/10
(52) U.S. Cl. ................ 137/116.3; 137/505; 137/505.18
(58) Field of Search ............................. 137/116.3, 102, 137/115.15, 505, 505.18

(56) References Cited

U.S. PATENT DOCUMENTS

| 2,561,431 | A | * | 7/1951 | Towler et al. ......... 137/115.15 |
| 3,033,578 | A | | 5/1962 | Kellogg |
| 3,455,566 | A | | 7/1969 | Hull et al. |
| 3,917,220 | A | | 11/1975 | Kinase et al. |
| 4,150,737 | A | | 4/1979 | Patton |
| 4,444,216 | A | | 4/1984 | Loup |
| 4,493,335 | A | | 1/1985 | Watson |
| 4,506,693 | A | | 3/1985 | Acker |
| 4,572,518 | A | | 2/1986 | Spargo et al. |
| 4,579,143 | A | | 4/1986 | Rollins et al. |
| 4,586,533 | A | | 5/1986 | Estes |
| 4,681,327 | A | | 7/1987 | d'Agostino et al. |
| 6,481,454 | B2 | | 11/2002 | Hope et al. |
| 6,568,418 | B1 | * | 5/2003 | Hope et al. .............. 137/116.3 |

* cited by examiner

Primary Examiner—Stephen M. Hepperle
(74) Attorney, Agent, or Firm—Blackwell Sanders Peper Martin LLP

(57) ABSTRACT

The regulator connects to a high pressure fluid supply and regulates the pressure to a downstream apparatus. If an over-pressure occurs, it is vented to atmosphere. An elongate control stem engages a supply seal assembly and a vent seal assembly and moves axially with respect to these seal assemblies to achieve regulation and venting. During high fluid flow, the supply seal assembly and the vent seal assembly are not in the fluid flow path of the regulator which makes the seal assemblies more resistant to erosion from fluid flow. The fluid flow path through the regulator is partially in hollow passageways in the elongate control stem.

29 Claims, 16 Drawing Sheets

FIG. 13 NEUTRAL

FIG. 14 NEUTRAL

OPEN

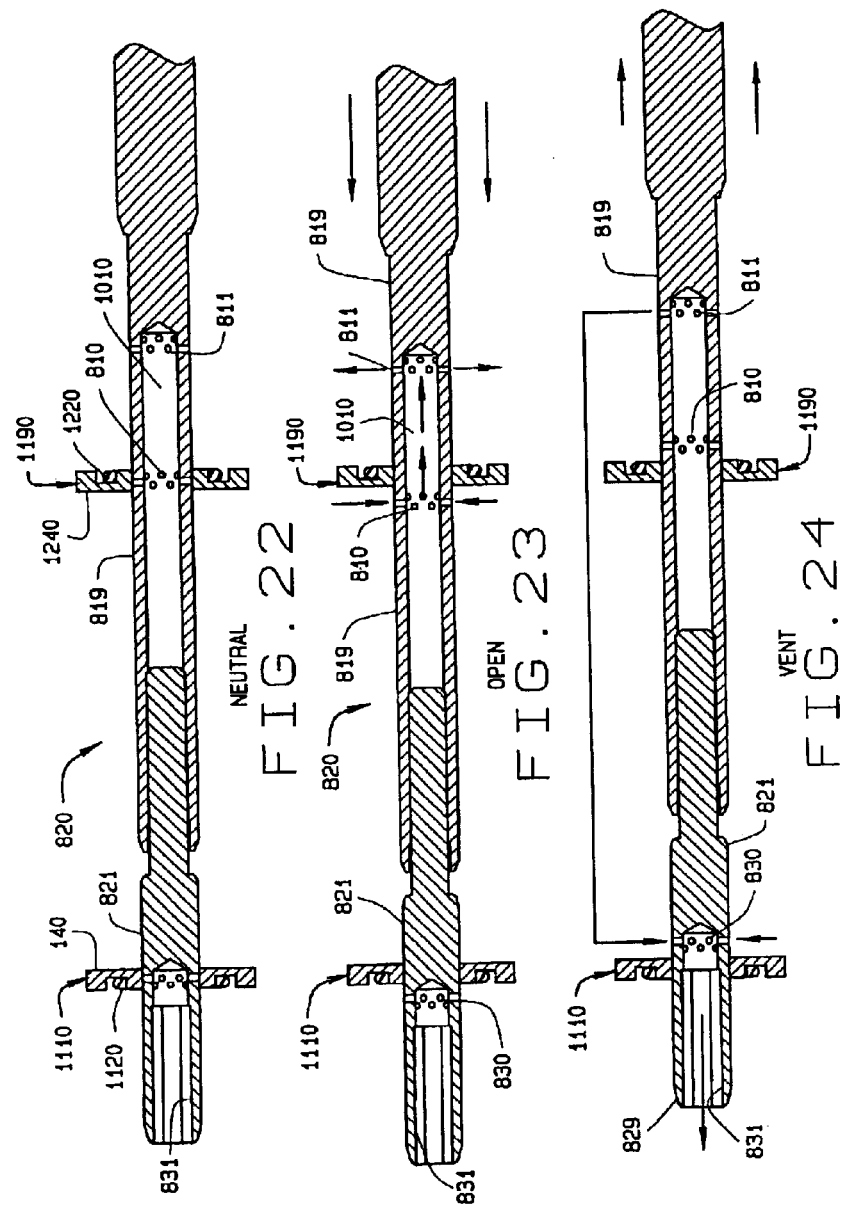

US 6,843,266 B2

REGULATOR WITH EROSION RESISTANT SEAL ASSEMBLIES

CROSS REFERENCE TO RELATED APPLICATIONS

This is a continuation-in-part of U.S. Patent Application Serial No. 09/640,401 filed on Aug. 16, 2000, now U.S. Pat. No. 6,568,418 for a Precision Regulator.

BACKGROUND OF INVENTION

The present invention is a regulator used for controlling fluid pressures in a downstream apparatus. The regulator can also vent excess downstream pressures to atmosphere. The body can be segmented into at least three interconnected parts.

DESCRIPTION OF RELATED ART

Gilmore Valve Company, the assignee of the present invention, has sold valves and other types of regulators for many years. Examples of these prior art devices are shown in U.S. Patent Nos. 3,917,220 and 4,493,335. In order to adjust the set point for these prior art regulators, the operator was required to turn a large handle at the top of the apparatus which would compress springs on the inside of the apparatus. This was sometimes difficult at higher set points.

In some prior art designs, the supply seal assembly and the vent seal assembly were in the fluid flow path which during high flow could degrade seal life and function. There is a need for seal assemblies that have longer life and reliability.

SUMMARY OF INVENTION

Prior art regulators are often difficult to adjust accurately at higher pressures, because the adjustment knob must push against the full force of a spring on the inside of the apparatus. In the present invention, the adjustment knob moves internal mechanisms including a small diameter control stem, not the spring.

Rotation of the adjustment knob of the present invention only requires minimum force. The higher forces and torques of prior art regulators tended to wear out the threads in the adjustment mechanism. The lower forces in the present invention minimize this wear.

Unlike some prior art designs, the supply seal assembly and the vent seal assembly of the present invention are not in the fluid flow path of the valve during high fluid flow. Positioning the supply seal assembly and the vent seal assembly out of the fluid flow during high fluid flow path enhances seal life and reliability. The fluid flow path through the present invention is partially contained in hollow passageways in the elongate control stem. In one embodiment, the regulator has a segmented body design with at least three interconnected segments.

BRIEF DESCRIPTION OF DRAWINGS

FIG. 13 shows the three segments of the body interconnected by elongate bolts.

FIG. 22 is a section view of a portion of the control stem; the supply seal assembly and the vent seal assembly in the neutral position.

FIG. 23 is a section view of a portion of the control stem, the supply seal assembly and the vent seal assembly in the open position. Fluid is flowing from supply to function as indicated by the flow arrow.

FIG. 24 is a section view of a portion of the control stem, the supply seal assembly and the vent seal assembly in the vent position. Fluid is flowing from function to vent as indicated by the flow arrows.

DETAILED DESCRIPTION

Figure 1:
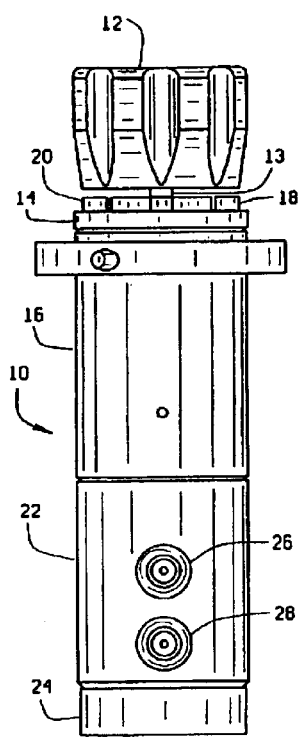
FIG. 1 is a side elevation view of the precision regulator showing the supply port and vent port.

FIG. 1 is a side elevation view of the precision regulator generally identified by the numeral 10. An adjustment knob 12 connects to an adjusting stem 13 to adjust the set point of the precision regulator 10. The retainer cap 14 is connected to the spring housing 16 by a plurality of cap screws 18 and 20. The spring housing 16 threadably engages the regulator body 22. A bottom flange 24 is connected to the regulator body 22 by a plurality of cap screws, not shown. The supply port 26 and the vent port 28 are formed in the regulator body 22.

Figure 2:
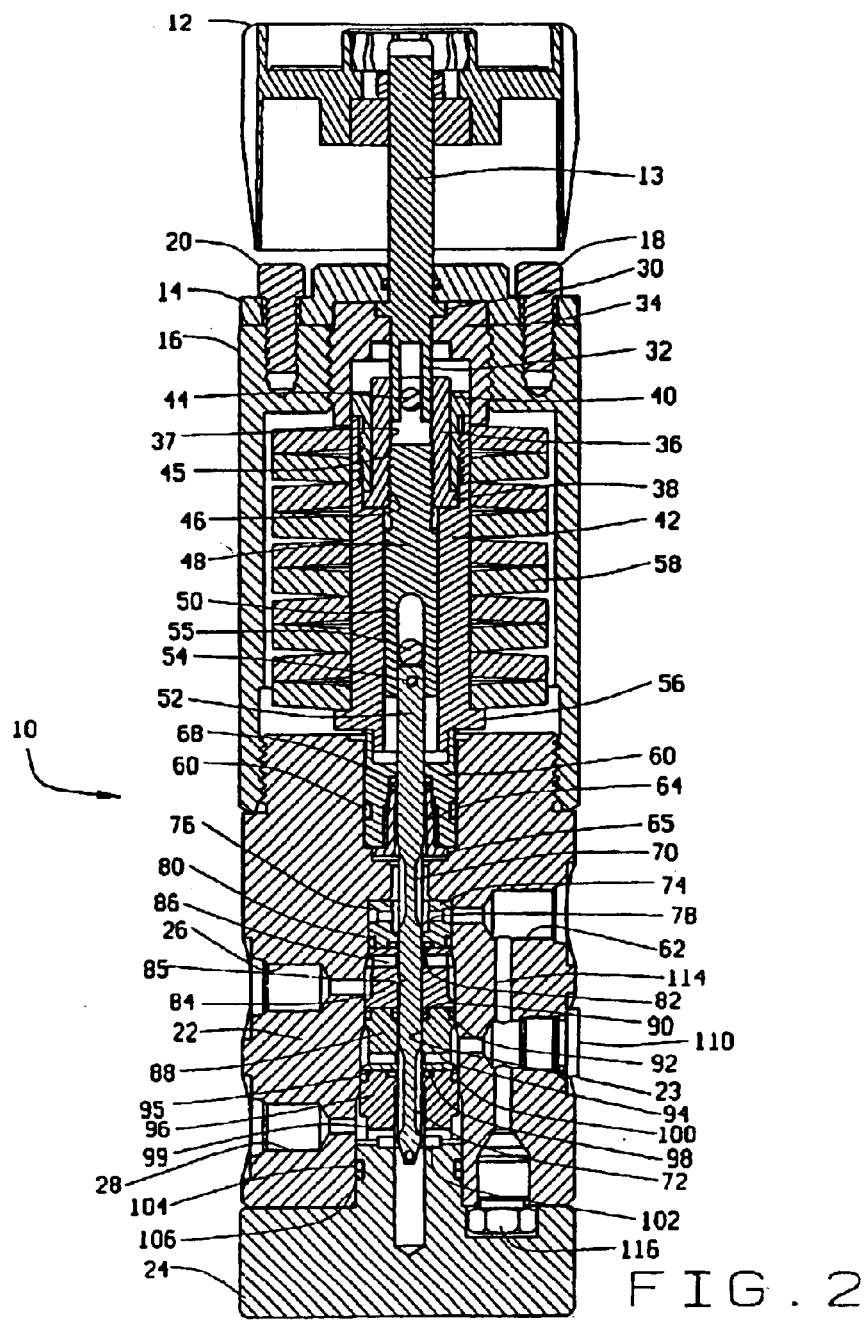
FIG. 2 is a section view of the precision regulator rotated ninety degrees clockwise from the view in FIG. 1.

FIG. 2 is a section view of the precision regulator of FIG. 1 except the orientation of the regulator has been rotated 90 clockwise. The adjustment knob 12 connects to an adjusting stem 13 which transmits rotational position to other components of the regulator as discussed below. The adjusting stem 13 includes an outwardly projecting circumferential flange 30 about halfway between both ends and a clevis 32 on the end opposite the knob 12. The retainer cap 14 is secured to the spring housing 16 by a plurality of cap screws 18 and 20. A spring retainer 34 threadably engages the upper end of the spring housing 16 and captures the outward flange 30 of the adjusting stem 13 against the retainer cap 14, allowing just enough room for the upper stem to rotate. Therefore, the knob 12 and adjusting stem 13 can rotate but are fixed axially to the spring housing 16.

The adjusting sleeve 36 has a hollow bore 37 through the longitudinal axis and an outwardly extending circumferential flange 38 on one end. The stem retainer 40 threadably engages the spring guide 42 and captures the outwardly extending radial flange 38 of the adjusting sleeve 36 against the bottom of the spring guide 42 counter bore, allowing just enough clearance for the adjusting sleeve 36 to rotate. Therefore, the adjustment sleeve 36 is allowed to rotate, but is fixed axially with respect to the spring guide 42.

The adjusting sleeve 36 has a transverse bore 43 on the end opposite the flange 38. The adjusting sleeve pin 44 passes through the transverse bore 43 in the adjusting sleeve 36 and the clevis 32 in the adjusting stem 13. Therefore, when the adjusting knob 12 is rotated, the adjusting stem 13, rotates as well as the adjusting sleeve pin 44 and the adjusting sleeve 36. The clevis 32 allows the adjusting sleeve 36 to move axially with respect to the adjusting stem 13 and adjusting knob 12. One end of the hollow central bore 37 of the adjusting sleeve 36 is threaded. The bore of the adjusting sleeve 36 has threads 46 below where the transverse bore 43 is positioned. The threads 45 engage threads 46 on the upper control stem 48. Axial pin 55 passes through a transverse hole 41 in the spring guide 42 and a transverse slot 50 in the upper control stem 48.

The pin 55 in the slot 50 allows the upper control stem 48 to move axially, but not rotationally with respect to the spring guide 42. The result is that as the adjusting sleeve 36 is rotated relative to the spring guide 42, the upper control stem 48 moves axially with respect to the spring guide. The lower control stem 52 is pinned to the upper control stem 48 by the pin 54. The two stems move axially together.

Thus, rotation of the control knob 12 causes the upper control stem 48 and the lower control stem 52 to move axially with respect to the spring guide 42, while allowing the spring guide 42 to move with respect to the knob 12, spring housing 16 and valve body 22. Thus, rotating the adjustment knob 12 counter-clockwise brings the set point to 0 psi and rotating the adjustment knob 12 clockwise brings the regulator 10 to its maximum set point.

The spring guide 42 includes an outwardly extending radial flange 56 on one end which captures the spring 58 against the spring retainer 34. The axial pin 55 passes through a transverse bore 41 in the spring guide 42 and slips back and forth in the slot 50 of the upper control stem 48. This feature allows adjustment of the lower control stem 52 independent of the spring 58. Rotation of the adjustment knob 12 does not increase or decrease the force being applied against the spring 58 by the spring guide 42. The force that is applied to the spring 58 is applied through the sensor piston 60 that is in contact with the flange 56 of the spring guide 42. Pressure from the regulated port 62 is applied against the sensor piston 60 which is then transferred via the flange 56 on the spring guide 42 to the spring 58.

The sensor piston 60 threadably engages the retaining nut 64. The sensor piston 60 includes an external 0-ring groove 61, which receives 0-ring 66 and back up ring. The 0-ring 66 and back-up ring achieve a dynamic seal between the body 22 and the sensor piston 60. The sensor piston also has an axial through hole. The retaining nut 64 captures the 0-ring 68 and another back-up ring to achieve a dynamic seal between the sensor piston 60 and the lower control stem 52. The lower control stem 52 includes a plurality of flow passages or slots 70 that permit fluid flow from the supply port to the regulated port 62 when the flow passages 70 are proximate with the supply seal assembly 82. A second set of flow passages 72 are formed in the lower control stem 52 which permit fluid to flow from the regulated port 62 to the vent port 28 when the flow passages 72 are proximate to the vent seal assembly 98.

An upper cylinder cage 74 is located in the bore of the body 22, adjacent to the regulated port 62. The upper cylinder cage 74 has a plurality of radial bores 76 and 77 and a longitudinal bore 78. Fluid can flow from the regulated port 62 through the radial bores 76 and 77 into the longitudinal bore 78. An 0-ring groove 73 is formed on the outside circumference of the upper cylinder cage 74 and receives the 0-ring 80. The supply seal assembly is generally identified by the numeral 82 and will be discussed in greater detail with regards to FIGS. 7, 8 and 9.

The lower control stem 52 passes through a longitudinal bore 85 in the supply cage 84. A plurality of radial bores 86 and 87 in the supply cage 84 extend from the longitudinal bore 85 to a circumferential groove 27.

Figure 3:
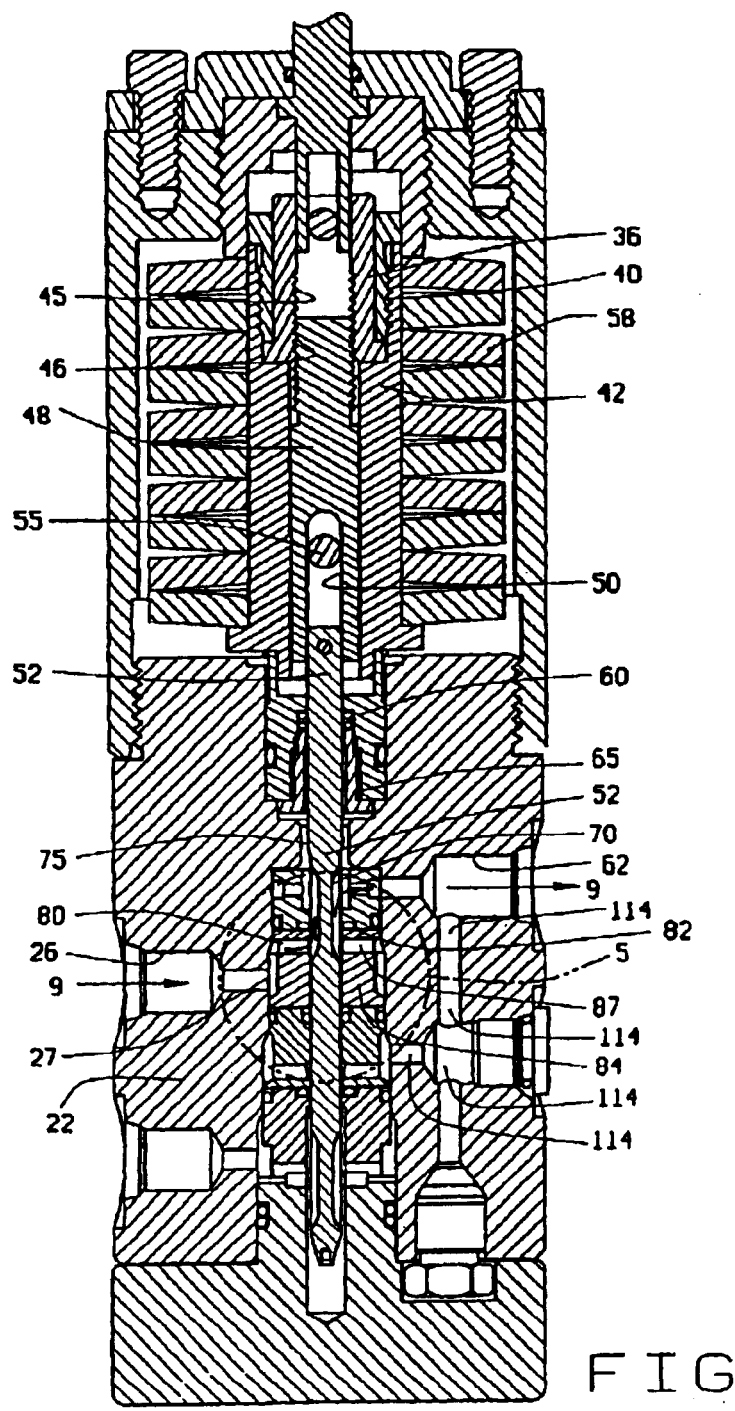
FIG. 3 is an enlarged section view of the precision regulator of FIG. 2, except fluid is flowing from the supply port to the regulated port, as indicated by the flow arrows.

A flow passageway sometimes called the supply passageway 9 extends from the supply port 26 to the regulated port 62 as indicated by the flow arrows in FIG. 3. Fluid moves from the supply port 26 through a circumferential groove 27 in the supply cage 84 through the radial bores 86 and 87 and into the longitudinal bore 85 of the supply cage 84. The fluid then moves into the longitudinal bore 78 of the upper cylinder cage 74 and through the radial bores 76 and 77 into the regulated port 62.

The seal retainer 88 has a longitudinal bore 23 through which passes the lower control stem 52. A plurality of radial bores 94 and 95 extend from the longitudinal bore 23 to the circumference groove 93 of the seal retainer 88.

An O-ring channel 91 is formed in outside circumference of the seal retainer 88 to receive the O-ring 92. The O-ring 92 forms a seal between the seal retainer 88 and body 22. Another O-ring groove 120 is formed around the longitudinal bore 23 to receive O-ring 121 and forms a seal between the seal retainer 88 and the lower control stem 52. A plurality of radial bores 94 and 95 are formed in the seal retainer 88. These bores extend from a circumferential groove 93 to the longitudinal bore 23.

The bottom guide 96 has a longitudinal bore 101 which receives the lower control stem 52. On the outside diameter of one end of the bottom guide 96 is a circumferential groove 103. On the other end of the bottom guide 96 is an O-ring channel 97 that receives and supports O-ring 100. O-ring 100 seals the bottom guide 96 against the body 22. The vent seal assembly is generally identified by the numeral 98 and is similar to the supply seal assembly which will be discussed in greater detail with regard to FIGS. 7, 8 and 9. A plurality of radial bores 99 and 101 are formed in the bottom guide 96 providing fluid communication between the longitudinal central bore 105 and the outside groove 103 of the bottom guide 96.

In order to take up manufacturing tolerances, a crush washer 102 is captured between the bottom guide 96 and the bottom flange 24. A groove 25 is formed in the bottom flange 24 and it receives an O-ring 104 and a back-up ring 106. The bottom flange 24 is sealed against the body 22 by the O-ring 104 and the back-up ring 106.

A plug 110 is installed in a plug port 112 in the body 22. The plug 110 can be removed and a gauge can be placed in this port at the preference of the user. A passageway 114 is bored parallel to the longitudinal axis of the valve 10 through the body 22, the port 112 and into the regulated port 62. A JIG fitting 116 is threaded in the body 22 to close off one end of the passageway 114.

Figure 4:
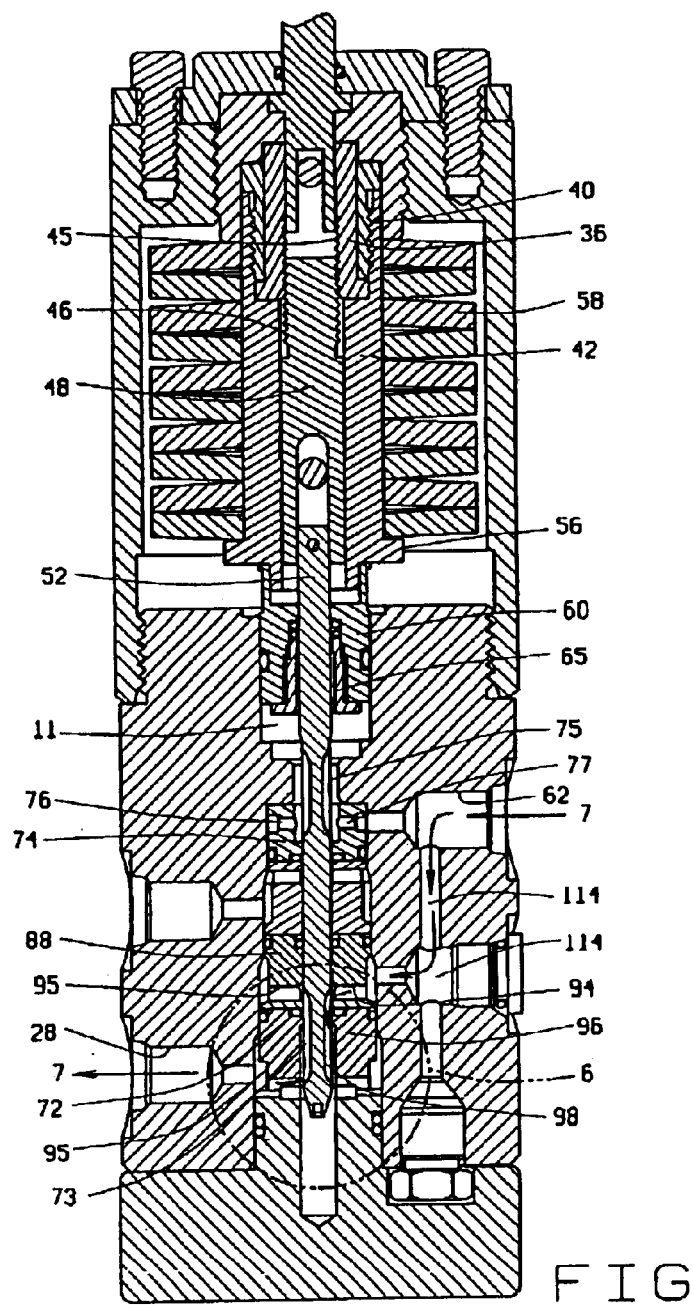
FIG. 4 is an enlarged section view of the precision regulator of FIG. 2, except fluid is flowing from the regulated port to the vent port, as indicated by the flow arrows.

A flow passageway, sometimes called the vent passageway 7 extends from the regulated port 62 to the vent port 28 as indicated by the flow arrows of FIG. 4 when the control stem 52 is in an appropriate position allowing the flow slots 72 to be in position to allow communication between the radial bores 94 and 95 in the seal retainer 88 and the radial bores 99 and 101 in the bottom guide 96. Fluid moves from the regulated port 62, through the passageways 114 and 115 into the radial bores 94 and 95 and into the longitudinal bore 23 of the seal retainer, into the longitudinal bore 105 through the radial bores 99 and 101 of the bottom guide 96 and out the vent port 28.

FIG. 3 is an enlarged section view of the regulator of FIG. 2. In FIG. 3, pressurized fluid is flowing through the supply passageway 9 as indicated by the flow arrows 9—9, from the supply port 26 to the regulated port 62. Turning the knob 12 clockwise moves the lower control stem 52 downward (from the position shown in FIG. 2), thus unseating the slots 70 in the control stem 52 from the supply seal assembly 82. Fluid moves along the supply passageway 9 as follows: from the supply port 26, around the circumferential groove 27 in the supply cage 84 through the radial bores 86 and 87, through the longitudinal passageway 85, into the longitudinal passageway 78 of the upper cylinder cage 74 and thereafter through the radial bores 76 and 77 into the regulated port 62.

The lower control stem 52 is moved downward as shown in FIG. 3 by rotating the knob 12 clockwise. This adjusts the set point in the regulated port 62. When the knob 12 is rotated clockwise, the adjusting stem 13 is rotated clockwise which rotation is then imparted through the adjusting sleeve pin 44 to the adjusting sleeve 36. The reverse threads 45 on the adjusting sleeve 36 and the threads 46 on the upper control stem 48 cause the upper control stem 48 to move downward in response to the clockwise rotation of the control knob 12. The upper control stem 48 is able to move downward because of the slot 50 which allows axial movement vis-a-vis the spring guide pin 55. The lower control stem 52 is connected to the upper control stem 48 by the control stem pin 54. The upper control stem 48 and the lower control stem 52 move axially as a unit. As a matter of manufacturing choice, the upper control stem 48 and the lower control stem 52 could be fabricated as a single part.

As the lower control stem 52 moves downward, the outer circumference 69 of the lower control stem 52 moves away from the supply seal assembly 82, thus allowing fluid to pass through the radial bores 86 and 87, through the flow slots 70 in the lower control stem 52, through the longitudinal passageway 78, and the radial bores 76 and 77 to the regulated port 62, as shown by the flow arrows in the drawing. After the pressure in the regulated port 62 increases to set point or set pressure, the pressure in the regulated port 62 passes through the passageway 75 in the body 22 and is exerted upon the retaining nut 65 and the sensor piston 60. As the sensor piston moves upward, it transfers the axial force to the flange 56 of the spring guide 42, thus compressing the spring 58. As the spring guide 42 moves upward, this axial movement is transferred to the stem retainer 40 and the adjusting sleeve 36. The threads 45 in the adjusting sleeve 36 engage the threads 46 on the upper control stem 48, thus imparting upward axial movement to the upper control stem 48, thus moving the lower control stem 52 upward, when the adjusting sleeve 36 moves upward. As the lower control stem 52 moves upward the flow slots 70 move upward and the outer circumference 69 of the lower control stem 52 again engages the supply seal assembly 82, thus blocking further flow from the supply port 26 into the regulated port 62 through the supply passageway 9.

If, for some reason, the regulated pressure drops, the spring 58 will relax. The piston 60 will move downward until the slot 70 crosses the supply seal assembly 82. Fluid will flow from the supply port 26 until the pressure increases to the set point which will be enough to move the outer circumference 69 of the lower control stem 52 back into engagement with the supply seal assembly 82.

When there is an overpressure situation in the regulated port 62, the lower control stem 52 moves axially upward, thus allowing the fluid to move from the regulated port 62 to the vent port 28 through the vent passageway 7, as better seen in FIG. 4.

FIG. 4 is an enlarged section view of the regulator of FIG. 2 in the vent position, as shown by the flow arrows. The fluid in the regulated port 62 exerts axial pressure on the sensor piston 60 causing compression of the spring 58 which causes the lower control stem 52 to move upward, as previously discussed. When the lower control stem 52 moves axially upward, the flow slots 72 disengage from the vent seal assembly 98 allowing fluid to flow as indicated by the flow arrows in FIG. 4.

To vent overpressure in the regulated port 62, the lower control stem 52 must move axially upward. This is achieved through the following interaction. The fluid in the regulated port 62 moves through the radial bores 76 and 77 in the upper cylinder cage 74 and through the angular passageway 75 into a pressure chamber 11. The pressurized fluid exerts force on the retaining nut 65 and the sensor piston 60 which surround the lower control stem 52 but do not impart axial movement to the lower control stem 52. Rather, the axial movement is transmitted from the sensor piston 60 to the flange 56 of the spring guide 42. This causes compression of the spring 58. The axial upward movement of the spring guide 42 is transmitted to the upper control stem 48 through the stem retainer 40 and thereafter to the adjusting sleeve 36. As previously discussed, the adjusting sleeve 36 is threadably engaged to the upper control stem 48 and therefore any axial movement in the adjusting sleeve 36 is immediately transferred to the upper control stem 48 and thereafter to the lower control stem 52. When the outer circumference 69 of the lower control stem 52 disengages from the vent seal assembly 98, fluid can then pass through the slots 72 in the lower control stem 52 and thereafter to the vent port 28.

As the venting process occurs, the amount of pressure on the sensor piston 60 diminishes. When this overcomes a predetermined set point, the force in the spring 58 overcomes the pressurized fluid force in the chamber 11, thus driving the spring guide 42 back to its lower position of FIG. 2. When the spring guide 42 moves axially downward, it carries the upper control stem 48 and the lower control stem 52 downward, as previously discussed which causes the flow slots 72 to move downward and thus outside circumference 69 of the lower control stem 52 re-engages with the vent seal assembly 98 thus stopping fluid flow.

Figure 5:
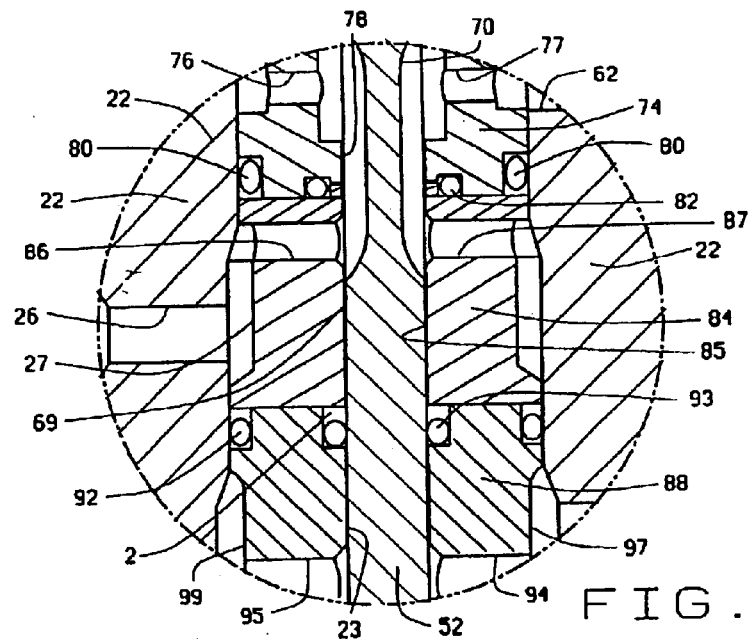
FIG. 5 is an enlarged section view of the precision regulator in the proximity of the supply seal assembly.

FIG. 5 is an enlargement of a portion of the regulator 10 showing the internal components in the open position of FIG. 3. As previously discussed, when fluid moves from the high pressure supply port 26 to the regulated port 62, along the supply passageway 9. The supply passageway 9 is defined by the circumferential groove 27 in the supply cage 84, the radial bores 86 and 87, the longitudinal passageway 85 in the supply cage and the longitudinal passageway 78 in the upper cylinder cage 74. The passageway then extends through the radial bores 76 and 77 in the upper cylinder cage 74 and out to the regulated port 62, as indicated by the flow arrows in FIG. 3.

Figure 6:
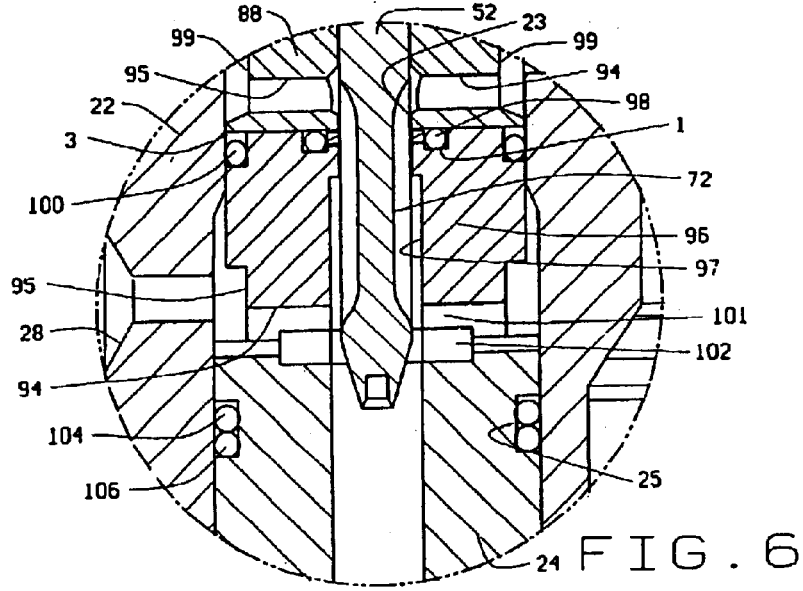
FIG. 6 is a section view of a portion of the precision regulator in the proximity of the vent seal assembly.

FIG. 6 is an enlarged section view of a portion of the regulator 10, showing the internal components in the vent position of FIG. 4. In FIG. 6, the lower control stem 52 has achieved its maximum axial upward position allowing fluid to move from the regulated port 62 through the vent passageway 7 to the vent port 28. The vent passageway 7 is defined by the passageway 114, the circumferential groove 93 and the radial bores 94 and 95 in the seal retainer 88. The passageway then extends through the longitudinal passage 23 in the seal retainer 88 and thereafter to the longitudinal central bore 105 in the bottom guide 96. The fluid then enters the radial bores 99 and 101 of the bottom guide 96 and thereafter passes into a circumferential groove 103. The fluid is then free to pass to the vent port 28 which is open to atmosphere.

Once the pressure in the regulated port 6Z has returned to the set point, the force in the spring 58 will be exerted upon the flange 56 of the spring guide 42, thus causing downward axial movement of the upper control stem 48 and the lower control stem 52, which causes the radial flow slots 72 to move downward, thus re-engaging the outer circumference 69 of the lower control stem 52 with the vent seal assembly 98.

Figure 7:
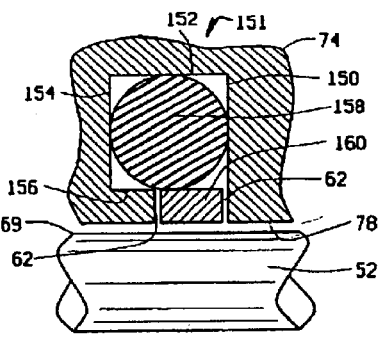
FIG. 7 is a section view of a portion of the supply seal assembly and control stem without any force being exerted on the O-ring or the seal ring.

FIG. 7 is an enlarged partial section view of one half of the supply seal assembly 82. The upper cylinder cage 74 has an O-ring channel or a hollow O-ring support structure 151 formed therein. The O-ring channel 151 is defined by an outer wall 152, two opposing side walls 150 and 154 and an inner wall 156, extending from one side wall less than half the length of the outer wall, thus creating an opening 63 to the longitudinal bore 78 in the cylinder cage 74. A flat seal ring 160 is positioned in the opening 63 between the sidewall 150 and the end of the inner wall 156. The lower control stem 52 is shown in reduced perspective to save space; it is not proportioned to the size of the O-ring in the actual embodiment. The outer circumference 69 of the lower control stem moves axially in the longitudinal passageway 78 of the upper cylinder cage 74.

The O-ring 158 and the seal ring 160 are shown in a relaxed position in FIG. 7, without any force being applied from either the supply port 26 or the regulated port 62. Applicants have found that a ⅜ inch outside diameter×¼ inch inside diameter×¹⁄₁₆ inch cross-section BUNA N90 duro National C67 compound 0-ring Is suitable for the o-ring 158. Other O-rings with similar properties from other manufacturers such as Parker may also be suitable.

Applicants have found that a 0.260 inch outside diameter 0.184 inch inside diameter×0.034 inch thick seal ring manufactured from PEEK (polyetheretherketone) is suitable for the seal ring 160. Other materials with similar rigidity and strength properties to PEEK may also be suitable.

Those skilled in the art will understand that the seal ring 160 is circular and fully surrounds the outside circumference 69 of the lower control rod 52. They will likewise recognize that the O-ring 158 is circular in shape and therefore it completely encircles the lower control stem 52 like the seal ring 160.

Figure 8:
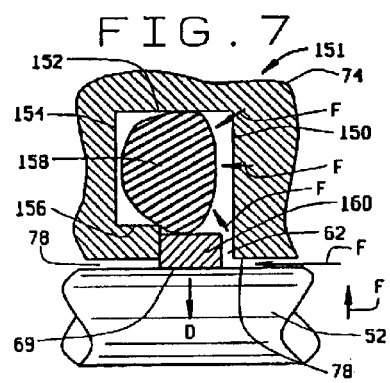
FIG. 8 is a section view of a portion of the supply seal assembly with pressure being exerted on the O-ring and the seal ring, as indicated by the arrows.

FIG. 8 is a partial section view of the supply seal assembly 82 under fluid compression when the regulator is in the neutral position and of FIG. 2. In this view, a seal has been achieved between the outside circumference 69 of the lower control stem 52 and the seal ring 160. Further, a seal has been achieved between the O-ring 158, the body 22, and the seal ring 160, thus preventing fluid from passing from the supply port 26 to the regulated port 62. High pressure fluid from the supply port 26 extends into the angular passageway 78 and into the O-ring channel or hollow O-ring support structure 151. The pressurized fluid enters the O-ring channel 151, as indicated by the arrows F, causing the O-ring 158 to be compressed and distorted, as shown approximately in the drawing. The distortion of the O-ring 158 causes it to extend into the opening 162, thus exerting inward radial forces on the seal ring 160, as shown by the arrow D. As the seal ring 160 is forced into contact with the outside circumference 69 of the lower control stem 52, it forms a tighter seal. This is sometimes referred to as a sliding seal because the control stem 52 moves axially up and down across the inner surface of the seal ring 160.

Figure 9:
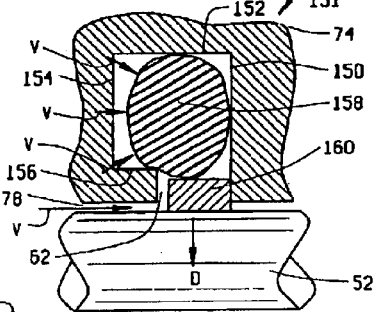
FIG. 9 is a section view of a portion of the supply seal assembly with pressure being exerted against the O-ring and the seal ring from the opposite direction of FIG. 8.

FIG. 9 is a partial section view of the supply seal assembly 82. In FIG. 9, the direction of the high pressure hydraulic fluid has been reversed from the direction of FIG. 8. When the regulator is in the vent position, as shown in FIG. 4, high pressure fluid moves through the angular opening 78 in the upper cylinder cage 74, as indicated by the flow arrows labeled V. This pressurized fluid then moves into the O-ring channel or support structure 151 as further indicated by the arrows V. The force of the hydraulic fluid compresses the O-ring 158 causing it to protrude into the opening 63. When it protrudes into this opening, it exerts force on the seal ring 160, as indicated by the arrow D. This causes the seal ring to engage and make a better seal with the outside diameter 69 of the lower control rod 52 and the upper cylinder cage 74. The supply seal assembly 82 is bi-directional and can create a sliding seal with the outside diameter 69 of the lower control rod 52 when high pressure fluid enters the O-ring channel 151 as indicated by the arrows in FIG. 9 or when the fluid reverses direction and enters the o-ring channel 151, as shown in FIG. 8. The vent seal assembly 98 is formed in the same fashion as the supply seal assembly 82, except the inner wall 156 extends from the sidewall 150 instead of sidewall 154, as better seen in FIG. 6.

Figure 10:
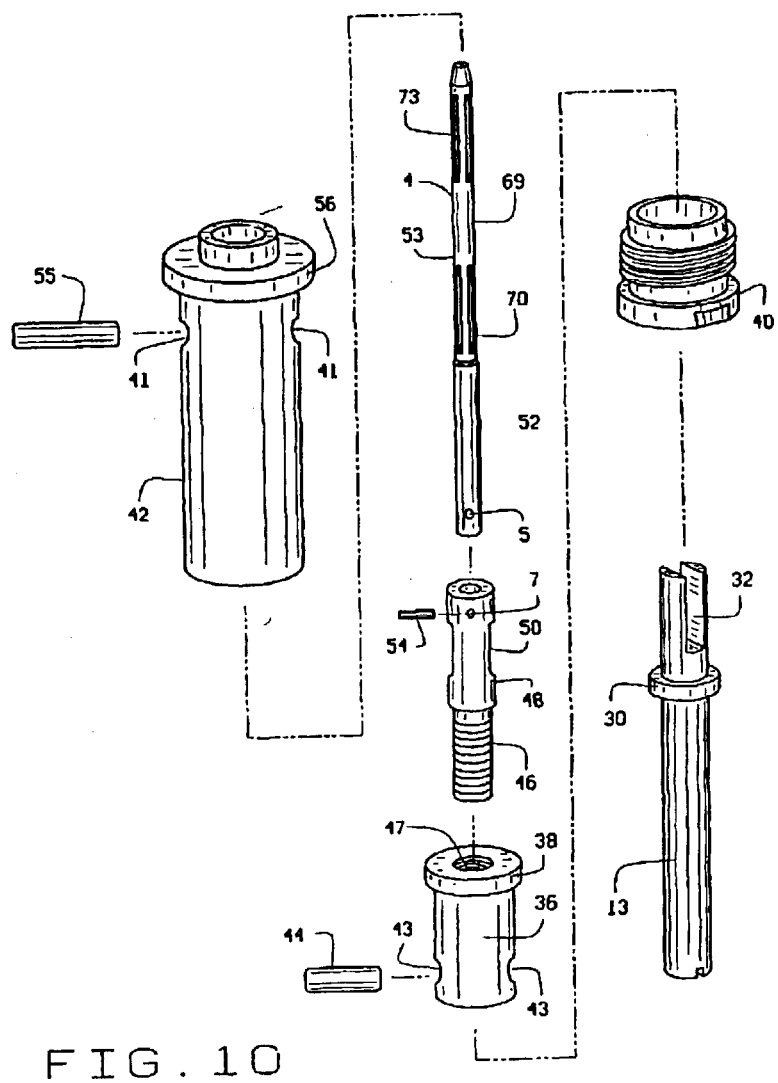
FIG. 10 is an enlarged perspective view of the control stem and some of the inner components of the precision regulator of FIG. 2.

FIG. 10 is an exploded perspective view of some of the inner components of the regulator 10. The adjusting stem 13 has a flange 30 and a clevis 32 formed on one end. The stem retainer 40 threadably engages the spring guide 42, thus capturing the adjusting sleeve 36 by virtue of the radial flange 38. The adjusting sleeve pin 44 passes through a transverse bore 43 to one end of the adjusting sleeve 36 and fits in the clevis 32 of the adjusting stem 13.

The spring guide 42 has a radial flange 56 formed on one end thereof. The spring guide pin 55 fits in a transverse aperture 41 formed through the spring guide 42. The upper control stem 48 is threaded on one end 46 and has a longitudinal slot 50 formed therein. The longitudinal slot allows movement of the upper control stem 48 axially relative to the spring guide 55. An aperture 7 is formed on one end of the upper control stem 48 to receive the control stem pin 54. The lower control stem 52 likewise has an aperture 5 which, when aligned with the aperture 7, receives the control stem pin 54, thus causing the upper control stem 48 and the lower control stem 52 to move axially as one component. Longitudinal flow slots 70 are formed in the lower control stem 52 and allow fluid to pass from the supply port 26 to the regulated port 62 when the lower control stem 52 and slots 70 are in the proper position relative to the supply seal assembly 82. In the neutral position, the supply seal assembly 82 makes a seal against the outside circumference 69 approximately at the point indicated at 53. Likewise, the vent seal assembly 98 forms a seal about the outside circumference 69 of the lower control stem 52 at a point approximately indicated by the numeral 4. Longitudinal flow slots 72 are formed in the lower control stem 52 and allow fluid to pass from the regulated port 62 to the vent port 28 when the lower control stem 52 and slots 73 is in the proper position relative to the vent seal assembly 98.

Figure 11:
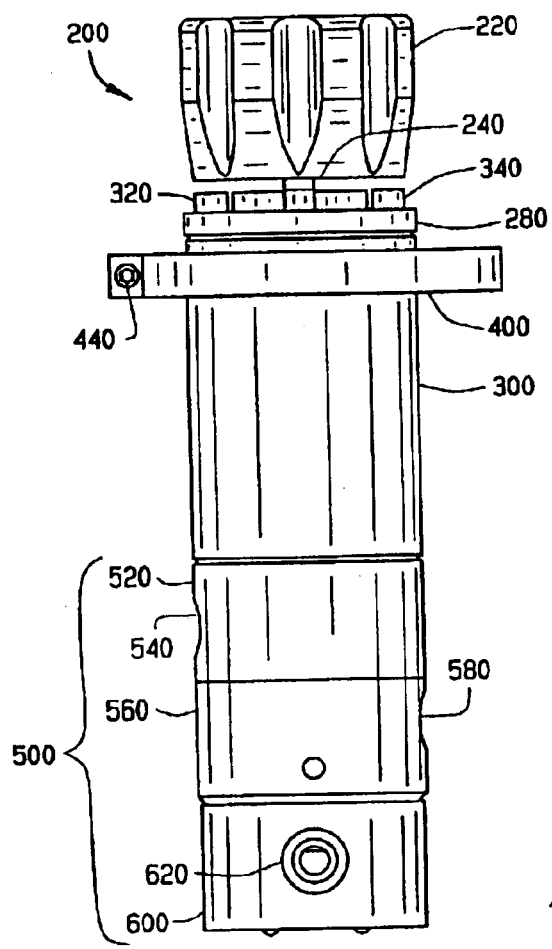
FIG. 11 is a side elevation view of a regulator with segmented body.

FIG. 11 is a side elevation view of a regulator with segmented body generally identified by the numeral 200. An adjustment knob 220 is secured to the adjustment stem 240 by jam nut 260, not shown in this figure. The adjustment knob 220 is rotated clockwise or counter-clockwise to adjust the set point of the regulator 200. Retainer cap 280 is attached to spring housing 300 by a plurality of bolts 320, 340, 360 and 380. (Bolts 360 and 380 are not shown in this figure.) A first mounting bracket 400 is connected to a second mounting bracket 420, better seen in FIG. 12. The mounting brackets are secured by bolts 440 and 460.

The segmented body 500 includes a function segment 520, a supply segment 560 and a vent segment 600. These interconnected segments, 520, 560 and 600 are sometimes referred to as pucks, because of their resemblance to hockey pucks. The function segment 520 includes the function port 540. (The port 540 is also sometimes referred to as the regulated port, the cylinder port or simply the outlet). The supply segment 560 includes the supply port 580. (The port 580 is sometimes referred to as the inlet.) The vent segment 600 includes the vent port 620. (The port 620 is sometimes referred to as the vent.) Typically, each port is threaded to facilitate with piping, hose or some other type of conduit. The supply port 580 is connected to and is in fluid communication with a pressurized fluid supply source, not shown. The function port 540 is connected to and is in fluid communication with a downstream apparatus, not shown. The vent port 620 is in fluid communication with atmosphere. The spring housing 300 threadibly engages the body 500 at the function segment 520, as better seen in other figures. A "Regulator with Segmented Body" is disclosed in U.S. Pat. No. 6,481,454 issued on Nov. 19, 2002 and is incorporated herein by reference. The '454 patent is assigned to Gilmore Valve Co., Ltd., the assignee of the present invention.

Figure 12:
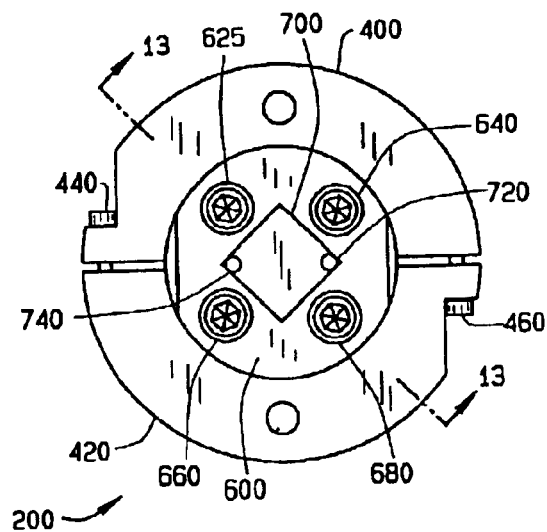
FIG. 12 is a bottom view of the regulator of FIG. 11.

FIG. 12 is a bottom view of the regulator 200 of FIG. 11. A plurality of bolts, 625, 640, 660 and 680 secure the vent segment 600 to the supply segment 560 and the function segment 520 as better seen in the next figure. A nametag 700 is secured to the bottom of the vent segment 600 by drive screws 720 and 740. First mounting bracket 400 is connected to second mounting bracket 420 by bolts 440 and 460.

Figure 13:
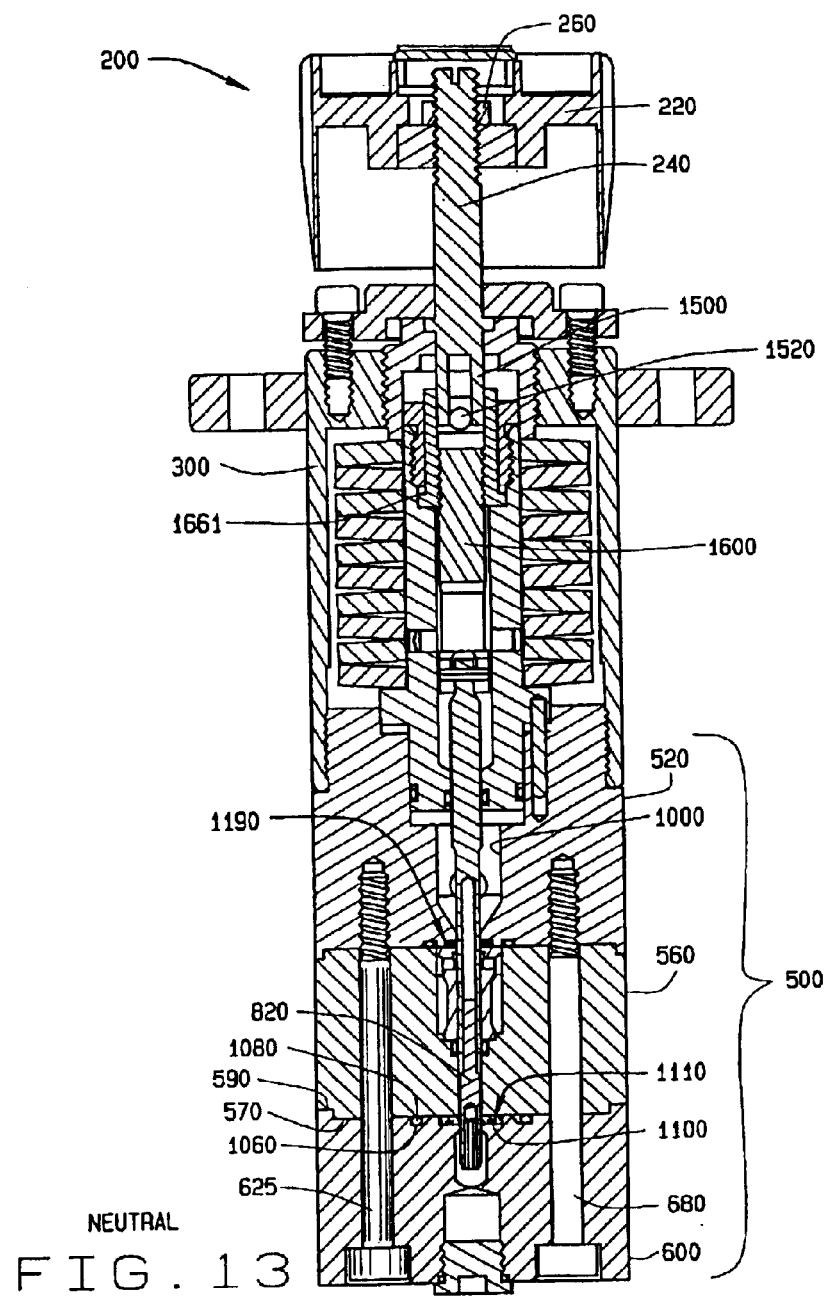
FIG. 13 is a section view of the regulator with erosion resistant seal assemblies taken along the line 13—13 of FIG. 12.

FIG. 13 is a section view of the regulator 200 along the line 13—13 of FIG. 12. This figure better illustrates how the segmented body 500 is assembled. Elongate bolts 625 and 680 pass through apertures in the vent segment 600, the supply segment 560 and engage threaded holes in the function segment 520. Though not shown in this figure, elongate bolts 640 and 660 likewise connect segments 520, 560 and 600. This design allows each segment, 520, 560 and 600 to be machined and put in inventory without porting. When an order is received each segment is drilled and tapped for the specific port size and type required by the customer. This allows the manufacturer to reduce the amount of inventory required for this product because each of the respective segments 520, 560 and 600 can be ported on an as needed basis.

The function port 540, the supply port 580 and the vent port 620 can be ordered in various sizes including ¼ inch, ⅜ inch, ½ inch, 9/16 inch and perhaps others. Ports 540, 580 and 620 can also be tapped with various thread designs as required by the customer including Medium Pressure (MP), National Pipe Thread (NPT), Joint Industry Council (JIC) and Society of Automotive Engineers (SAE).

An axial passageway 1000 is formed in the center of each of the respective body segments 520, 560 and 600. The shape of the axial passageway 1000 varies along its length. The lower control stem 820 is positioned in the axial passageway 1000. A lower control stem 820 moves up and down in the axial passageway in order to regulate the downstream pressure in the function port 540. (Port 540 is sometimes also referred to as a cylinder port).

In order to achieve a seal between the vent segment 600 and the supply segment 560, a channel 1060 is formed on an interior face 570 of the vent segment 600 surrounding the axial passageway 1000. An o-ring 1080 is positioned in the channel 1060 to achieve a seal between the vent segment 600 and the supply segment 560. Those skilled in the art will recognize that the o-ring 1080 could also be positioned in a face 590 of the supply segment 560.

Figure 19:
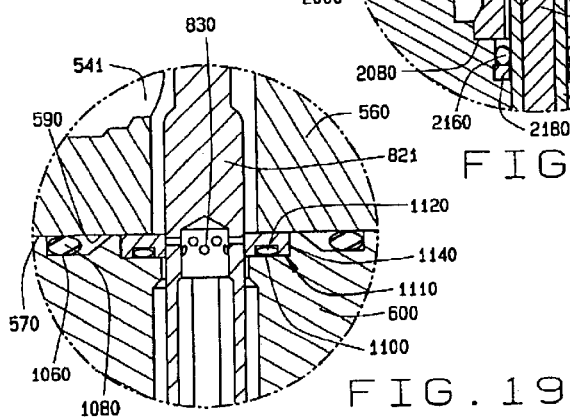
FIG. 19 is an enlargement of the vent seal assembly in the neutral position as shown along the line 19 of FIG. 14.

A vent seal assembly generally identified by the numeral 1110 achieves a seal between the body 500 and the lower control stem 820 at the junction of segments 560 and 600. A channel 1100 is formed in the interior face 570 of the vent segment 600 to receive the vent seal assembly 1110 which includes an o-ring 1120 and a C-shaped seal ring 1140. The vent seal assembly 1110, and better seen in FIG. 19 is enlarged. Those skilled in the art will recognize that the vent seal assembly could also be positioned in the face 590 of the supply segment 560.

Figure 18:
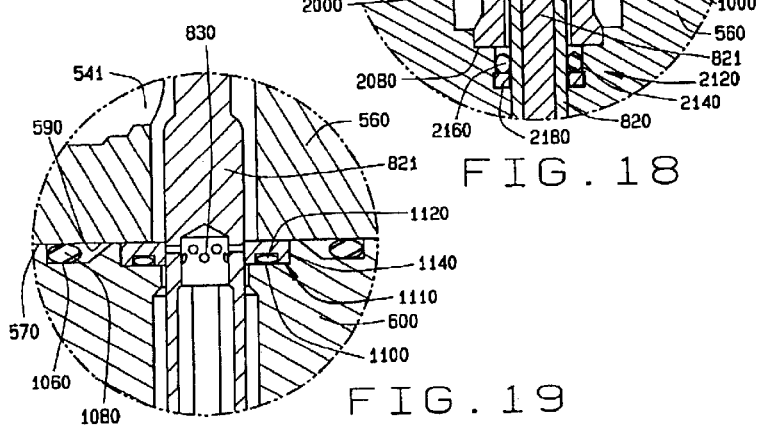
FIG. 18 is an enlargement of the supply seal assembly in the neutral position as shown along the line 18 of FIG. 14.

In order to achieve a seal between the function segment 520 and the supply segment 560, a channel 1160, as better seen in FIG. 18, is formed on an interior face 530 of the function segment 520. An o-ring 1180 is positioned in the channel 1160 to achieve a seal between the function segment 520 and the supply segment 560. Those skilled in the art will recognize that the o-ring 1180 could also be placed stet a face 610 of supply segment 560.

A supply seal assembly generally identified by the numeral 1190 achieves a seal between the body 500 and the lower control stem 820 at the junction of segments 560 and 520. A channel 1200 is formed on the interior face 530 of the function segment 520. The channel 1200 receives the supply seal assembly 1190 which includes an o-ring 1220 and a C-shaped seal ring 1240. The supply seal assembly 1190 is enlarged and better seen in FIG. 18–21.

Figure 14:
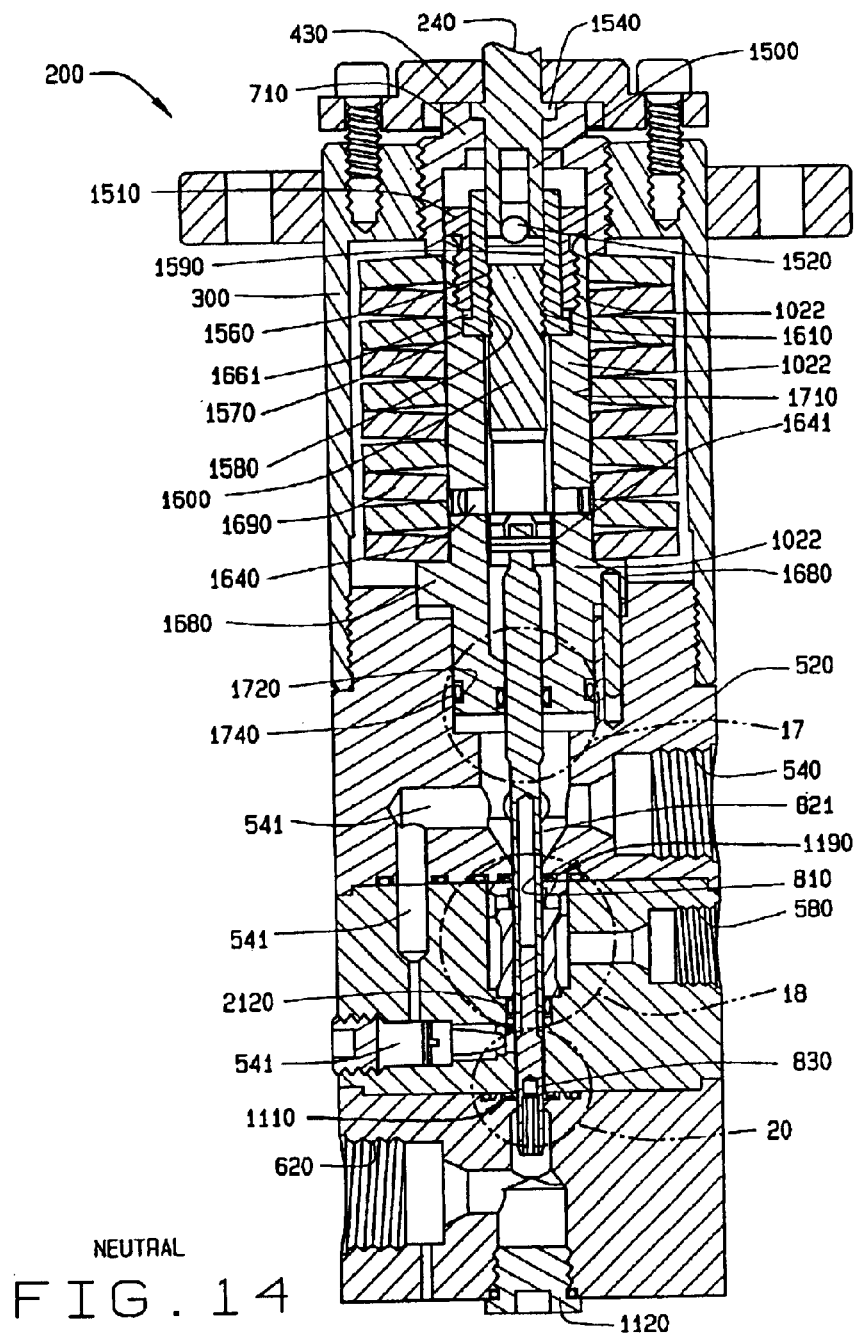
FIG. 14 is a section view of the regulator with erosion resistant seal assemblies of FIG. 13 taken out of hand so all of the ports can be seen in one drawing. The regulator in FIG. 14 is in the no flow or neutral position. In production, the function, supply and vent ports are actually aligned as shown in FIG. 11.
Figure 15:
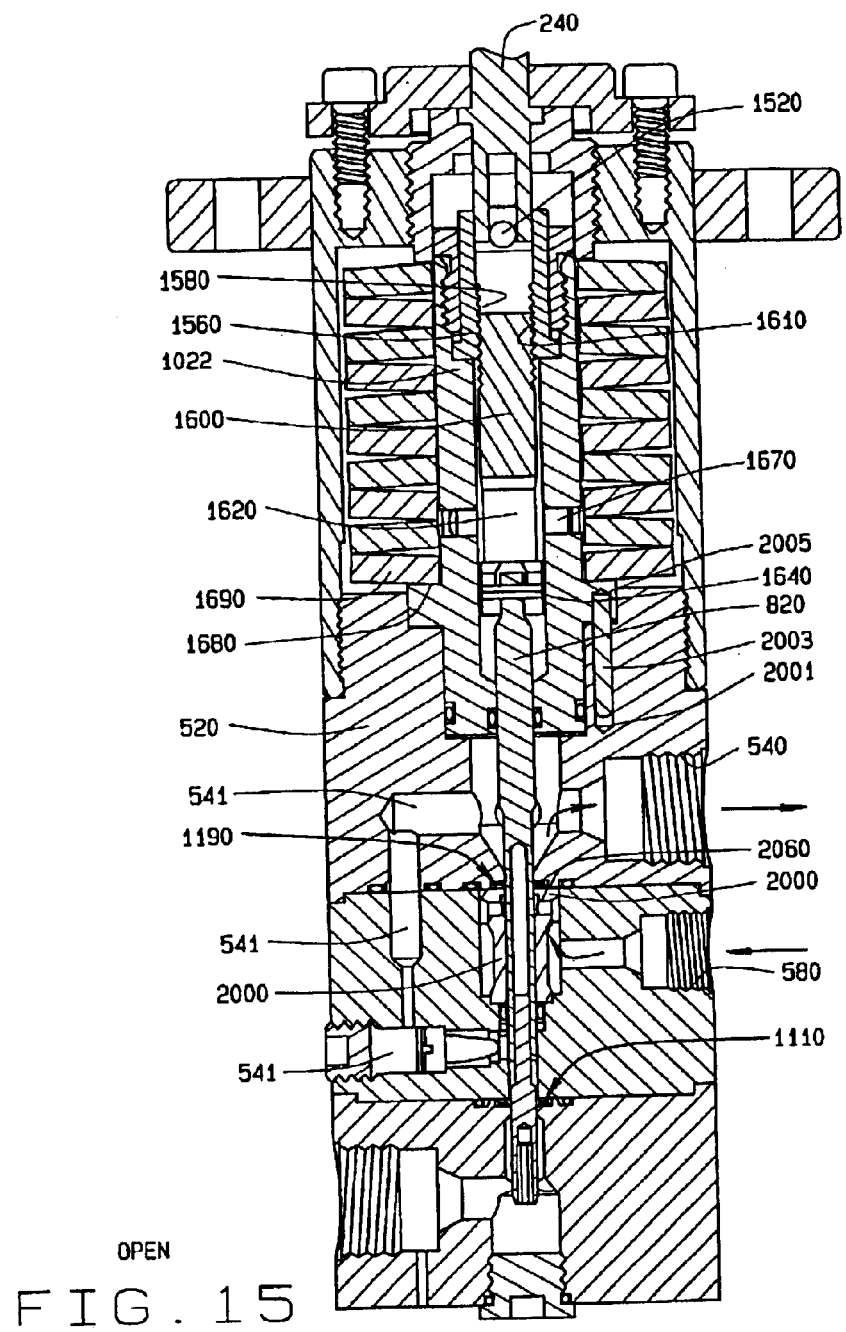
FIG. 15 is a section view of the regulator of FIG. 14 except the regulator with erosion resistant seal assemblies is in the open position with fluid flowing from the supply through the regulator to function as indicated by the flow arrows. Again, the ports are taken out of hand so all ports as seen in one drawing.
Figure 16:
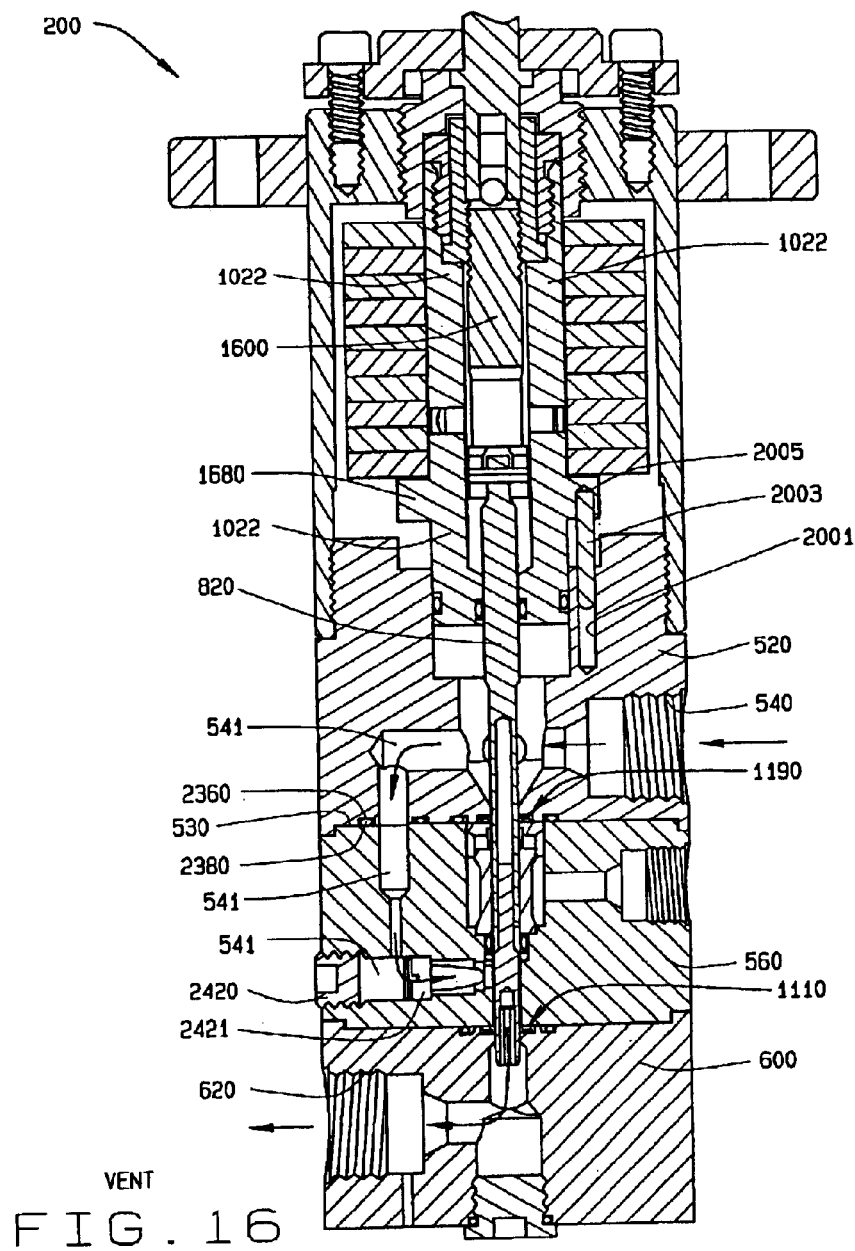
FIG. 16 is a section view of the regulator of FIG. 14 except that regulator with erosion resistant seal assemblies is in the vent position with fluid flowing from the function through the regulator and out the vent as indicated by the arrows. Again, the ports are taken out of hand so all ports can be seen in one drawing.

The regulator 200 has three positions: the neutral or no flow position of FIGS. 13, 14 and 22 the open position of FIG. 15 and the vent position of FIG. 16. Like most regulators, the primary purpose of the present invention is to regulate or otherwise control the pressure at the function port 540 to a downstream apparatus. The set point (also called set pressure) can be adjusted up or down over a range of approximately 500 to 10,000 psi. In order to lower the regulated pressure or set point, the adjustment knob 220 is turned counter clockwise. To raise the set point the adjustment knob 220 is turned clockwise.

When the regulator 200 moves from the neutral position of FIGS. 13, 14 and 22 to the open position of FIGS. 15 and 23, the lower control stem 820 moves downward disengaging inlet holes 810 from the supply seal assembly 1190. Supply pressure then moves from the supply port 580 through the global change to inlet holes 810 through upper flow passageway 1010 inside the control stem and through outlet holes 811 out function port 540. The flow path through the lower control stem 820 is better seen in FIG. 23. When the regulator 200 moves from the neutral position of FIG. 14 to the vent position of FIG. 16, the lower control stem 820 moves upward disengaging vent holes 830 from the vent seal assembly 1110 as better seen in FIG. 24. Excess pressure then moves from the function port 540 through an auxiliary vent passageway 541, through vent holes 830, lower flow passageway 831, outlet aperture 829, and out the vent port 620 to atmosphere. The manner in which the lower control stem 820 moves up and down will be described below.

FIG. 14 is a sectional illustration of the regulator of FIG. 11 taken out of hand so all the ports can be seen in one drawing. In production, the ports are actually aligned as shown in FIG. 11. In FIG. 14, the regulator 200 is shown in the no flow or neutral position. In this position, the inlet holes 810, better seen in FIG. 22, flow through control stem portion 819 of lower control stem 820 are in sealing engagement with the supply seal assembly 1190 which in conjunction with the intermediate seal assembly 2120 contains the supply pressure in the supply port 580. The vent holes 830, better seen in FIG. 22, of the lower control stem 820 are also in sealing engagement with the vent seal assembly 1110 preventing any fluid from the function port 540 escaping to the vent port 620. Thus there is no fluid flow through the regulator 200 in FIG. 14.

As previously discussed, the adjustment knob 220, not shown in this figure, is rotated clockwise or counter-clockwise to adjust the set point which controls the regulated pressure in the function port 540. When the adjustment knob 220 is turned, this rotation is imparted to the adjustment stem 240. One end of the adjustment stem 240 is secured to the adjustment knob 220 with a jam nut 260. A clevis 1500 is formed on the opposite end of the adjustment stem 240. The clevis 1500 slips over the adjusting sleeve pin 1520. An outwardly projecting circumferential flange 1540 is formed in the mid-section of the adjustment stem 240. The flange 1540 is captured between the retainer cap 430 and the spring retainer 710, allowing just enough room for the stem 240 to rotate. Therefore, the knob 220 and adjustment stem 240 can rotate but are fixed axially to the spring housing 300.

An adjusting sleeve 1560 has a hollow bore 1590 through the longitudinal axis and an outwardly extending circumferential flange 1570 on one end. A stem retainer 1510 threadibly engages the unitized sensor piston. A slip ring 1661 is positioned between the stem retainer 1510 and the outwardly extending radial circumferential flange 1570 of the adjusting sleeve 1560. The slip ring is preferably formed from Teflon® brand elastomer or any other non-gauling material. The slip ring 1661 makes it easier to turn the adjustment knob 220. The stem retainer 1510 and the slip ring 1661 capture the outwardly extending radial circumferential flange 1570 of the adjusting sleeve 1560 against the bottom of the unitized sensor piston counter bore, allowing just enough clearance for the adjusting sleeve 1560 to rotate. Therefore, the adjusting sleeve 1560 is allowed to rotate, but is fixed axially with respect to the unitized sensor piston spring carrier 1022.

Figure 25:
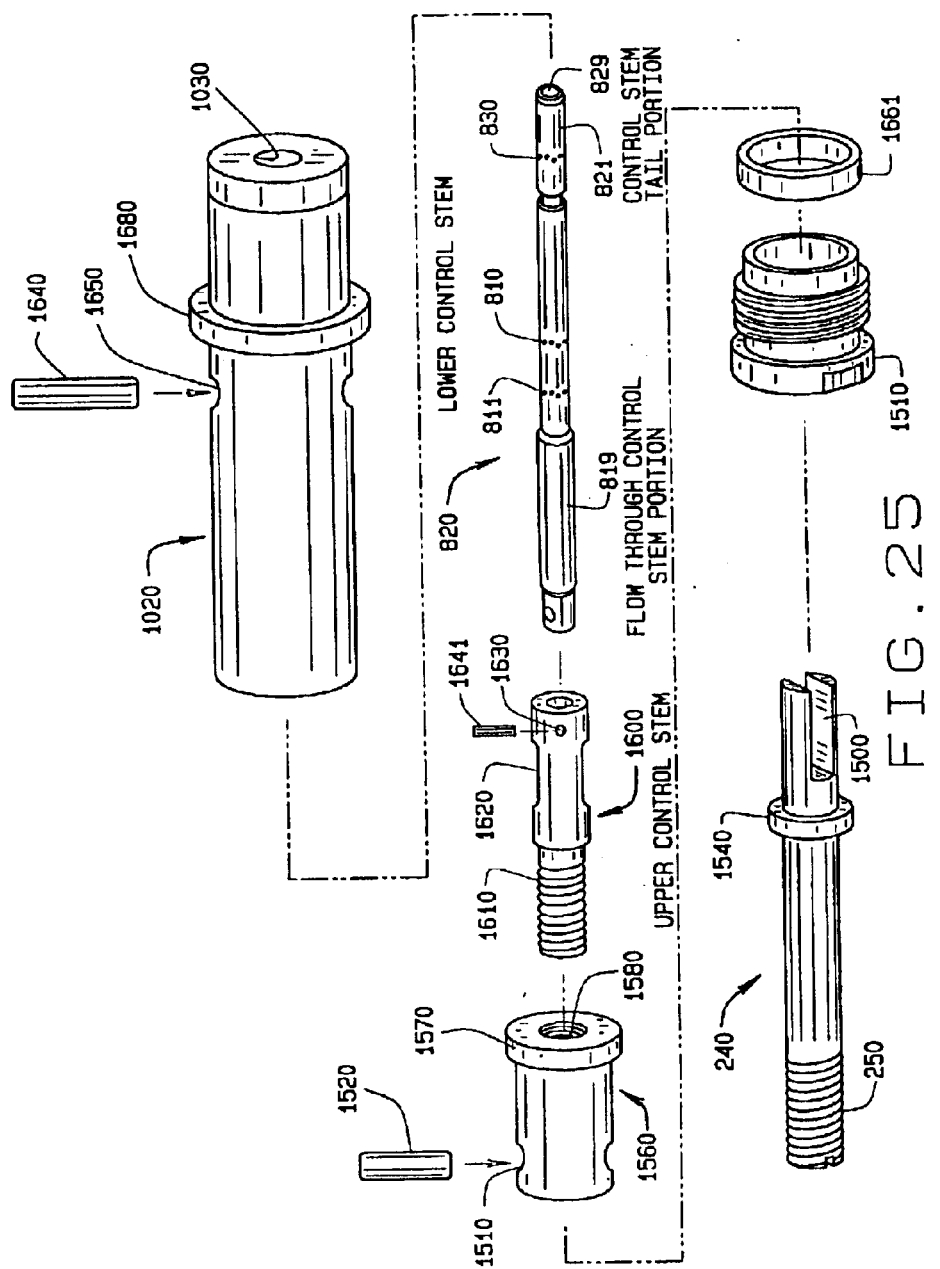
FIG. 25 is an enlarged perspective view of the control stem and other internal components of the regulator with erosion resistant seal assemblies of FIG. 14.

The adjusting sleeve 1560 has a transverse bore 1510, better seen in FIG. 25, on the end opposite the flange 1570. The adjusting sleeve pin 1520 passes through the transverse bore 1510 in the adjusting sleeve 1560 and the clevis 1500 in the adjustment stem 240. Therefore, when the adjusting knob 220 is rotated, the adjustment stem 240 rotates as well as the adjusting sleeve pin 1520 and the adjusting sleeve 1560. The clevis 1500 allows the adjusting sleeve 1560 to move axially with respect to the adjustment stem 240 and knob 220. One end of the sleeve 1560 has threads 1580 below where the transverse bore 1510 is positioned. The threads 1580 engage threads 1610 on the upper control stem 1600. Axial pin 1640 passes through a transverse hole 1650 in the unitized sensor piston spring carrier 1022 and a transverse slot 1620 in the upper control stem 1600.

A pin 1640 in a slot 1620 allows the upper control stem 1600 to move axially, but not rotationally with respect to the unitized sensor piston spring carrier 1022. The result is that as the adjusting sleeve 1560 is rotated relative to the unitized sensor piston, the upper control stem 1600 moves axially with respect to the unitized sensor piston. The lower control stem 820 is pinned to the upper control stem 1600 by the pin 1640. The two stems 820 and 1600 move axially together.

Thus, rotation of the knob 220 causes the upper control stem 1600 and the lower control stem 820 to move axially with respect to the unitized sensor piston, while allowing the unitized sensor piston to move axially with respect to the knob 220, spring housing 300 and valve body 500. Thus, rotating the knob 220 counter-clockwise brings the set point to 0 psi and rotating the knob 220 clockwise brings the regulator 200 to its maximum set point.

The unitized sensor piston includes an outwardly extending radial flange 1680 on one end which captures the belleville spring 1690 against the spring retainer 710. A belleville spring 1690 has a longitudinal central opening 1710 sized and arranged to receive the unitized sensor piston spring carrier 1022. The spring guide pin 1640 passes through a transverse bore 1650 in the unitized sensor piston and slips back and forth in the slot 1620 of the upper control stem 1600. This feature allows adjustment of the lower control stem 820 independent of the spring 1690. Rotation of the knob 220 does not increase or decrease the force being applied against the spring 1690 by the unitized sensor piston spring carrier 1022. The force that is applied to the spring 1690 is applied through the unitized sensor piston spring carrier 1022 that is in contact with the flange 1680 of the unitized sensor piston spring carrier. Pressure from the function port 540 is applied against the unitized sensor piston, which is then transferred via the flange 1680 on the unitized sensor piston spring carrier 1022 to the spring 1690.

Figure 17:
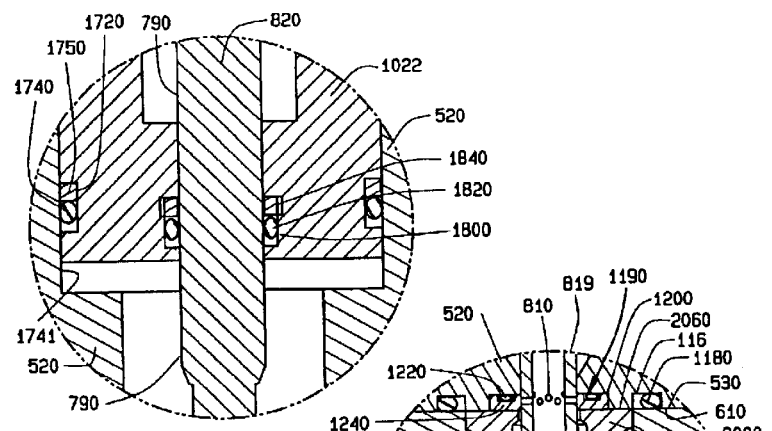
FIG. 17 is an enlargement of the unitized sensor piston spring carrier and seal assembly in the neutral position as shown along the line 17 of FIG. 14.

The unitized sensor piston spring carrier 1022 includes an external o-ring groove 1720, which receives unitized sensor piston spring carrier 1022 o-ring 1740 and a back up ring 1750, better seen in FIG. 17. The o-ring 1740 and back-up ring 1750 achieve a dynamic seal between the function segment of body 520 and unitized sensor piston spring carrier. The unitized sensor piston spring carrier 1022 also has an axial through hole 1030 sized to receive the lower control stem 820. A channel 1800 receives an o-ring 1820 and another back-up ring 1840 to achieve a dynamic seal between the unitized sensor piston spring carrier 1022 and the lower control stem 820, better seen in FIG. 17. The lower control stem 820 includes a flow through control stem portion 819 and a control stem tail portion 821, better seen in FIG. 25. The flow through control stem portion 819 is partially hollow and is sized to receive a portion of the control stem tail portion 821. The flow through control stem portion 819 and the control stem tail portion 821 define an upper flow passageway 1010 best seen in FIG. 22. Inlet holes 810 and outlet holes 811 are formed in the flow through control stem portion 819, as best seen in FIG. 22. Vent holes 830 are formed in the control stem tail portion 821. The control stem tail portion 821 defines a hollow lower flow passageway 831 and an outlet aperture 829. When the regulator 200 is in the vent position, as shown in FIG. 16, fluid flows through the vent holes 830, the lower flow passageway 831 and the outlet apertures 829 to the vent port 620. When the regulator is in the open position of FIG. 15 fluid flows through the inlet holes 810, through the upper flow passageway 1010 in the lower control stem 820 and through the outlet holes 811 to the function port 540.

FIG. 15 is a sectional illustration of the regulator of FIG. 14 taken out of hand so all of the ports can be seen in one drawing. In FIG. 15 is a sectional illustration of the regulator 200 in the open position allowing fluid to flow from the supply port 580 to the function port 540 which raises downstream pressure to the predetermined set point. In order to move from the no-flow or neutral position of FIG. 14 to the open position of FIG. 15, the lower control stem 820 must move downwards as shown in FIGS. 15 and 23 causing the inlet holes 810 to move out of engagement with the supply seal assembly 1190 thus allowing fluid to flow from the supply port 580 through the upper flow passageway 1010 in the lower control stem 820 to the function port 540.

The lower control stem 820 is moved downward as shown in FIG. 15 by rotating the control knob 220 clockwise. This adjusts the set point in the function port 540. When the control knob 220 is rotated clockwise, the adjustment stem 240 is rotated clockwise which rotation is then imparted through the adjusting sleeve pin 1520 to the adjusting sleeve 1560. The reverse threads 1580 on the adjusting sleeve 1560 and the threads 1610 on the upper control stem 1600 cause the upper control stem 1600 to move downward in response to the clockwise rotation of the control knob 220. The upper control stem 1600 is able to move downward because of the slot 1620 which allows axial movement vis-à-vis a spring guide pin 1670. The lower control stem 820 is connected to the upper control stem 1600 by the control stem pin 1640. The upper control stem 1600 and the lower control stem 820 move axially as a unit. As a matter of manufacturing choice, the upper control stem 1600 and the lower control stem 820 could be fabricated as a single part.

As the lower control stem 820 moves downward, the inlet holes 810 of the lower control stem 820 moves away from the supply seal assembly 1190, thus allowing fluid to pass through the inlet holes 810 in the lower control stem 820, through the upper flow passageway 1010, to the function port 540, as shown by the flow arrows in the drawing and FIG. 23. After the pressure in the function port 540 increases to set point or set pressure, axial force from the fluid in the function port 540 is exerted upon the unitized sensor piston spring carrier 1022. As the unitized sensor piston spring carrier 1022 moves upward. It transfers the axial force to the flange 1680 of the unitized sensor piston spring carrier 1022, thus compressing the spring 1690. As the unitized sensor piston spring carrier moves upward, this axial movement is transferred to the stem retainer 1510 and the adjusting sleeve 1560. The threads 1580 in the adjusting sleeve 1560 engage the threads 1610 on the upper control stem 1600, thus imparting upward axial movement to the lower control stem 820, thus moving the lower control stem 820 upward, when the adjusting sleeve 1560 moves upward. As the lower control stem 820 moves upward the inlet holes 810 move upward and engages the supply seal assembly 1190, thus blocking further flow from the supply port 580 into the function port 540.

If, for some reason, the regulated pressure drops (i.e., the pressure in the function port 540), the spring 1690 will relax. The unitized sensor piston spring carrier 1022 will move downward until the inlet holes 810 are disengaged from the supply seal assembly 1190. Fluid will flow from the supply port 580 until the pressure increases to the set point which will be enough to move the lower control stem 820 which brings the inlet holes 810 back into engagement with the supply seal assembly 1190.

The supply seal assembly 1190 is held in place in the function segment 520 by an upper end 2060 of a sleeve 2000. This relationship is better seen in the enlargement, FIG. 18. The sleeve 2000 has a longitudinal bore 2020 which is sized and arranged to allow the lower control stem 820 to move freely relative to the sleeve 2000. A plurality of transverse bores 2040 allow fluid communication between the longitudal bore of the sleeve 2000 and the axial bore passageway 1000 of the regulator 200.

As better seen in FIG. 18, the other end 2080 of the sleeve 2000 holds an intermediate seal assembly 2120 in place. This intermediate seal assembly 2120 is positioned in a channel 2140 in the supply segment 560 of the body 500. The channel 2140 holds the intermediate seal assembly 2120, which consists of an o-ring 2160 and a back-up ring 2180. The intermediate seal assembly 2120 forms a seal between the lower control stem 820 and the supply segment 560 of the body 500 to prevent supply pressure from escaping to vent. Supply pressure is therefore isolated in the supply port 580 by the intermediate seal assembly 2120, the supply seal assembly 1190 and the o-ring 1180.

When there is an excess pressure in the function port 540, the lower control stem 820 moves axially upward, thus allowing the fluid to move from the function port 540 to the vent port 620, as better seen in the next figure.

FIG. 16 is a sectional illustration of the regulator 200 of FIG. 14 taken out of hand so all of the ports can been seen in one drawing. In FIG. 16 of the regulator 200 in the vent position. On occasion, downstream pressure exceeds the set point or controlled pressure and it is necessary to vent this excess pressure to atmosphere. When this occurs, the excess pressure in the function port 540 drives the unitized sensor piston spring carrier 1022 upward. As the sensor piston 1022 moves upward, so does the lower control stem 820. When the vent holes 830 move out of engagement with the vent seal assembly 1110, fluid flows from the function port 540 through the auxiliary vent passageway 541 and out the vent port 620. As better seen in FIG. 24, fluid flows though the vent holes 830 and the lower flow passageway 831 of the lower control stem 820 as shown by the flow arrows in FIG. 16.

The function port 540 is in fluid communication with the axial passageway 1000 and the auxiliary vent passageway 541. In order to form a seal around the auxiliary flow passageway 541 as it moves from the function segment 520 through the supply segment 560, a channel 2360 is formed in the face 530 of the function section 520. An o-ring 2380 is positioned in the channel 2360 to form a seal between the function segment 520, the supply segment 560 around the passageway 541. Passageway 541 is sealed to atmosphere by a NPT plug 2420. A screen 2421 is placed in the passageway 541.

When venting, fluid moves as indicated by the flow arrows from the function port 540, through the passageway stet, to the axial passageway 1000. The fluid then moves through the vent holes 830 and the lower flow passageway 831 in the lower control stem 820 thus passing the vent seal assembly 1110 and thereafter exiting the regulator 200 at vent port 620.

As the venting process occurs, the amount of pressure on the unitized sensor piston spring carrier diminishes. When this overcomes a predetermined set point, the force in the spring 1690 overcomes the forces in the function port 540, thus driving the unitized sensor piston spring carrier 1022 back to its lower position of FIG. 14. When the unitized sensor piston moves axially downward, it causes the upper control stem 1600 and the lower control stem 820 to move downward, which causes the vent holes 830 to move downward and thus the 820 re-engages with the vent seal assembly 1110 thus stopping fluid flow to vent.

Total maximum travel up and down of the upper control stem 1600 and lower control stem 820 is about ¼ inch. The amount of the movement shown in the drawings has been exaggerated to better illustrate operation of the invention. When the knob 220 is turned counter clockwise, the lower control stem 820 moves downward (i.e. away from the knob 220) to a zero psi set point (because of the reverse threads). A bore 2001 is formed in the function segment 520. The bore 2001 is sized to receive a portion of an anti-rotation pin 2003. Another bore 2005 is formed in the flange 1680 of the unitized sensor piston spring carrier 1022. Stet anti-rotation pin 2003 prevents the unitized sensor piston spring carrier 1002 from spinning in the function segment 520 and thus prevents a lock-up from excessive rotation of the knob 220.

When the knob 220 is turned clockwise, the lower control stem 820 moves upward (i.e. towards the knob 220) because of the reverse threads, to a maximum psi set point.

The movement of the control stem from the maximum up position to the maximum down position is approximately 0.025 inches. However, in operation, the typical amount of movement from the open position in FIG. 15 to the vent position of FIG. 16 is from approximately 0.010 inch to 0.020 inch. Other distances may be suitable depending on the size of the regulator and other manufacturing considerations.

FIG. 17 is an enlargement of a portion of the unitized sensor piston spring carrier 1022 and seal assembly in the neutral position as shown along the line 17 of FIG. 14. The outer circumference 790 of the lower control stem 820 seals against the o-ring 1820. The o-ring 1740 seals against a bore 1741. Together the o-rings 1820 and 1740 help to contain fluid pressure in the function port 540.

FIG. 18 is an enlargement of a portion of the regulator 200 along the line 18 from FIG. 14. FIG. 18 shows the regulator 200 in the neutral or no-flow position. In the no flow position, the outer circumference 790 of the control stem 820 seals against the supply seal assembly 1190. The inlet holes 810 in the lower control stem 820 are positioned adjacent the supply seal assembly 1190 in the no flow position thus precluding any fluid flow from the supply port 580 past the supply seal assembly 1190. Fluid in the supply port 580 is contained because of the supply seal assembly 1190, the intermediate seal assembly 2120 and the o-ring 1180.

FIG. 19 is an enlargement of the portion of the regulator 200 along the line 19 of FIG. 14. FIG. 19 shows the regulation 200 in the neutral or no-flow position with the vent holes 830 adjacent the vent seal assembly 1110.

Figure 20:
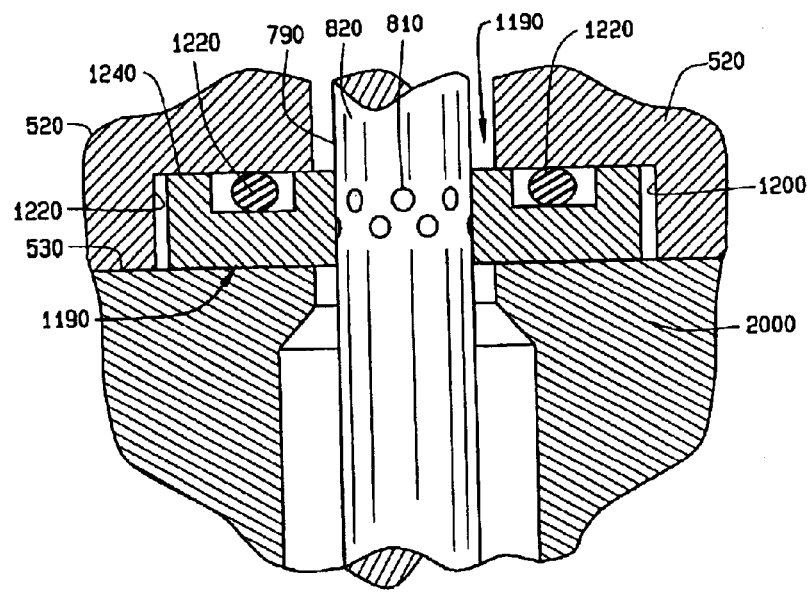
FIG. 20 is an enlargement of the supply seal assembly in an unpressurized state.

FIG. 20 is an enlargement of the supply seal assembly 1190 in an unpressurized state. The spool 2000 supports the supply seal assembly 1190 in the channel 1200 of function segment 520. The inlet holes 810 are adjacent the seal assembly 1190.

Figure 21:
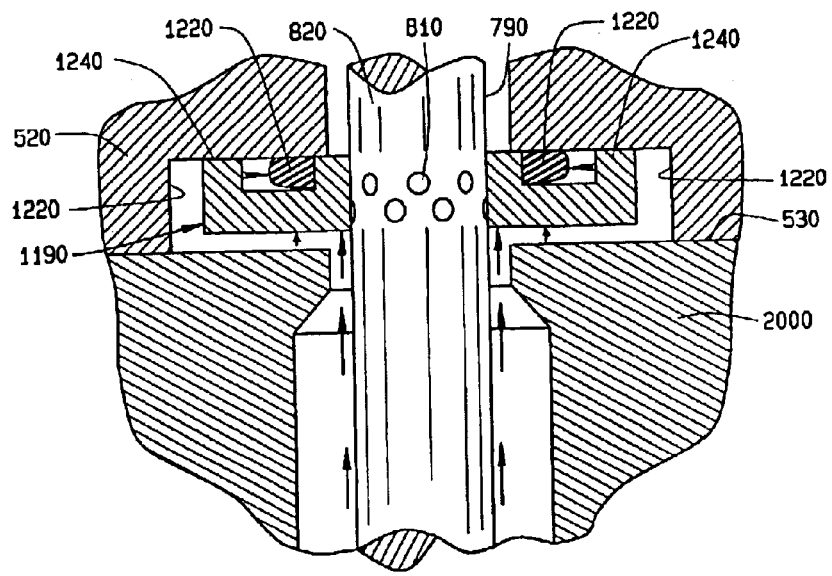
FIG. 21 is an enlargement of the supply seal assembly in a pressurized state. The arrows indicate the load applied by the fluid pressure to the supply seal assembly.

FIG. 21 is an enlargement of the supply seal assembly 1190 in a pressurized state. The arrows indicate fluid pressure from the supply port 580. The fluid pressure compresses the c-shaped seal 1240 and the o-ring 1220 as shown. The inner circumference of the seal 1240 seals against the outer circumference 790 of the lower control stem 820. The position of the supply seal assembly 1190 as shown in FIG. 21 is the same as shown in the next figure.

FIG. 22 is a section view of a portion of the lower control stem 820, the supply seal assembly 1190 and the vent seal assembly 1110 in the neutral or no-flow position, corresponding to FIGS. 13 and 14. The supply seal assembly 1190 seals the inlet holes 810 against fluid flow in the neutral position. The vent seal assembly 1110 seals the vent holes 830 against fluid flow in the neutral position.

FIG. 23 is a section view of a portion of the lower control stem 820, the supply seal assembly 1190 and the vent seal assembly 1110 in the open position corresponding to FIG. 15. The lower control stem 820 has moved downward as indicated by the arrows in the drawing and the inlet holes 810 have disengaged from the supply seal assembly 1190. Fluid flows, as indicated by the flow arrows, from the supply port 580, through the inlet holes 810, the upper flow passageway 1010, the outlet holes 811 to the function port 540, as better seen in FIG. 15. A regulator rated for about 10,000 psi operating pressure may have a maximum flow rate of about 7 gpm with a 3/16 inch diameter control stem and a Cv of about 0.067. Larger diameter control stems will increase the flow rate throughout the regulator as will higher pressures. For example, a regulator rated for about 20,000 psi operating pressure may have a maximum flow rate of about 10 gpm with a 3/16 inch diameter control stem and a Cv of about 0.067. At higher flow rates of about 2 gpm or more, the supply seal assembly and the vent seal assembly are completely isolated from fluid flow through the regulator. Higher flow rates of about 2 gpm or more typically occur at differential pressures of about 2,000 or more. For example if the regulator is set at about 8,000 psi and pressure in the function port drops to about 5,000 psi, the pressure differential is about 3,000 psi. A 3,000 psi differential will result in high fluid flow through the regulator, during which the supply seal assembly and the vent seal assembly will be completely isolated from the fluid flow which enhances seal life and reliability of the regulator. At lower flow rates of less than 2 gpm, the supply seal assembly and the vent seal assembly are partially exposed to fluid flow because the inlet holes and the vent holes may not have completely disengaged from the respective seal assemblies. However, at the lower flow rates of less than 2 gpm, the seal assemblies are not as subject to erosion as they are at higher flow rates of above 2 gpm or more.

FIG. 24 is a section view of a portion of the lower control stem 820, and the vent seal assembly 1110 in the vent position corresponding to FIG. 16. The lower control stem 820 has moved upward as indicated by the arrows in the drawing and the vent holes 830 have disengaged from the vent seal assembly 1110. Fluid flows, as indicated by the flow arrows, through the passageway 541, the vent holes 830, the lower flow passageway 831, the outlet aperture 829, through the vent port 620 to atmosphere, as better seen in FIG. 16.

FIG. 25 is an exploded perspective view of some of the internal components of the regulator 200. The lower control stem 820 is connected to the upper control stem 1600 by the control stem pin 1641 which passes through bore 1630 in the upper control stem 1600. Threads 1610 on the upper control stem 1600 threadably engage the internal bore 1580 of the adjusting sleeve 1560. The clevis 1500 of adjustment stem 240 engages the adjusting sleeve pin 1520. Pin 1520 passes through transverse bore 1510 in adjusting sleeve 1560. When the adjustment stem 240 is rotated by the adjustment knob 220, not shown, it causes the adjusting sleeve 1560 to rotate. When the adjusting sleeve 1560 rotates it causes the upper control stem 1600 and the lower control stem 820 to move axially relative to the regulator 200 because of the threaded engagement at 1580. In this manner, the set point of the regulator can be adjusted up or down. Rotation of the adjustment knob 220 counter-clockwise brings the set point of the regulator to zero psi and rotation clockwise brings the regulator 200 to its maximum set point.

Figure 26:
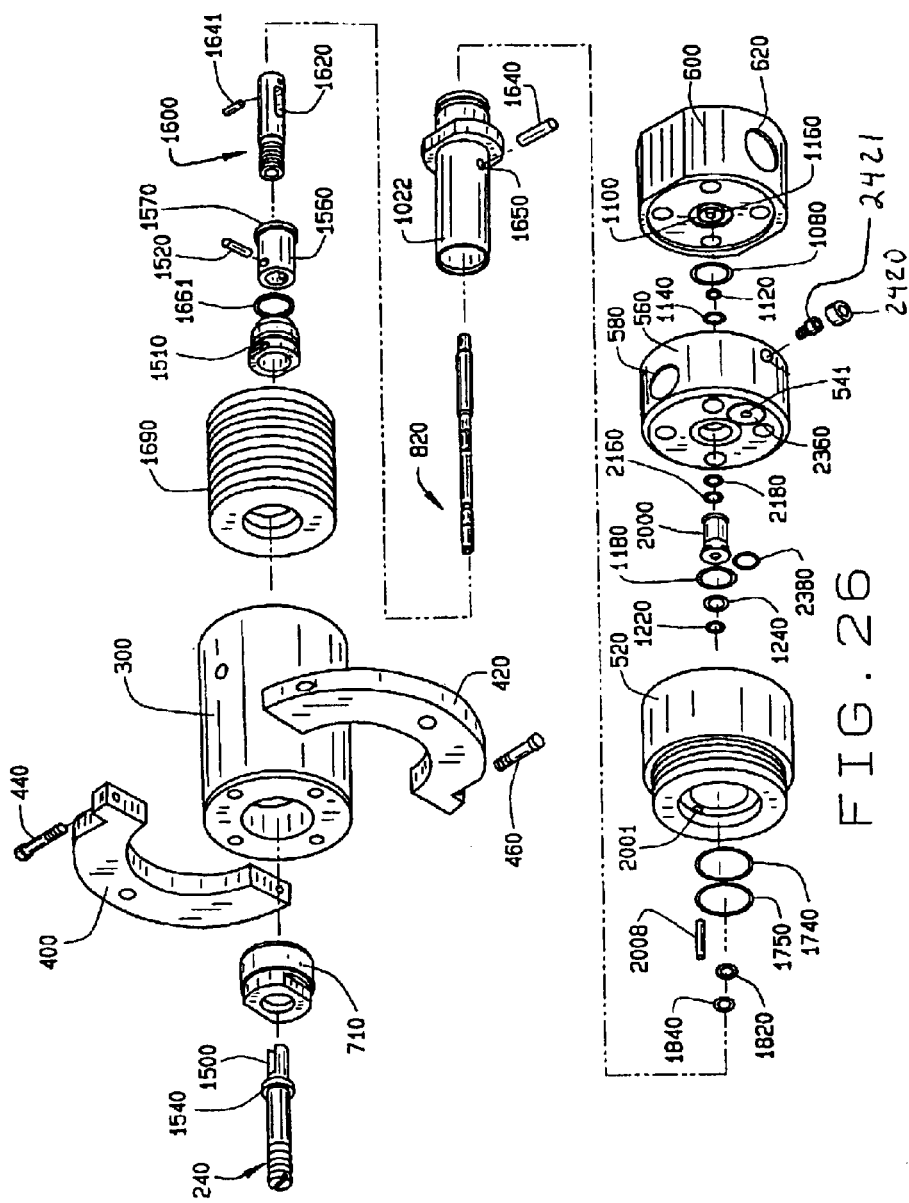
FIG. 26 is an enlarged perspective view of some of the components of the regulator.

FIG. 26 is an exploded perspective view of some of the components of regulator 200. Adjustment stem 240 extends through spring retainer 710, with clevis 1500 engaging adjusting sleeve pin 1520. The first mounting bracket 400 and the second mounting bracket 420 are secured by bolts 440 and 460 about the spring housing 300 containing spring 1690.

The slip ring 1661 is positioned between stem retainer 1510 and flange 1570 of adjusting sleeve 1560. Lower control stem 820 is connected to upper control stem 1600 by control stem pin 1641. The upper control stem 1600 threadably engages adjusting sleeve 1560 by reverse threads 1610. Axial pin 1640 passes through hole 1650 in the uitized sensor piston spring carrier 1022 and transverse slot 1620 in upper control stem 1600.

O-ring 1820 and backup o-ring 1840 achieve a dynamic seal between unitized sensor piston spring carrier 1022 and lower control stem 820. O-ring 1740 and backup O-ring 1750 achieve a dynamic seal between unitized sensor piston spring carrier 1022 and function segment 520. Function segment 520 includes bore 2001 that receives anti-rotation pin 2003.

O-ring 1220 and c-shaped seal ring 1240 form the supply seal assembly 1190 and seal against the lower control stem 820. O-ring 1180 creates a seal between function segment 520 and supply segment 560. Supply segment 560 includes supply port 580 and channel 2360 for o-ring 2380, thereby forming a seal between function segment 520 and supply segment 560 at passageway 541. The screen 2421 fits in passageway 541. Passageway 541 is sealed by an NPT plug 2420.

Vent segment 600 has a vent port 620 and channel 1100 to accept o-ring 1120 and c-shaped seal 1140 to form vent seal assembly 1110. O-ring 1080 in channel 1060 forms a seal between vent segment 600 and supply segment 560.

What is claimed is:

1. A regulator with erosion resistant seal assemblies, the regulator connected to a pressurized fluid supply, a downstream apparatus and a vent, the regulator comprising:

a body having a supply port, a regulated port and a vent port, the supply port connected to the pressurized fluid supply, the regulated port connected to the downstream apparatus and the vent port open to atmospheric pressure;

an axial opening in the body for an elongate control stem;

a control stem operatively connected to an external adjustment knob to adjust a set point of the regulator, the control stem having a closed position in which no fluid flows through the regulator, an open position in which fluid flows from the supply port through the control stem to the regulated port and a vent position in which fluid flows from the regulated port through the control stem to the vent port;

the control stem having a central shaft with an upper flow passageway proximate a supply seal assembly, and a lower flow passageway proximate a vent seal assembly, the control stem concurrently sealing against the supply seal assembly and the vent seal assembly to prevent fluid flow through the regulator when the control stem is in the closed position;

the control stem being operatively connected to a sensor piston which is exposed to pressurized fluid in the regulated port to move the control stem when fluid pressure in the regulated port falls below the set pressure to disengage the upper flow passageway from the supply seal assembly to allow fluid to flow from the supply port through the upper flow passageway in the control stem to the regulated port when the control stem is in the open position; and the control stem being operatively connected to the sensor piston which is exposed to pressurized fluid in the regulated port to move the control stem when fluid pressure in the regulated port exceeds the set pressure to disengage the lower flow passageway from the vent seal assembly to allow fluid to flow from the regulated port through the lower flow passageway in the control stem to the vent port when the control stem is in the vent position.

2. The regulator of claim 1 wherein the supply seal assembly and the vent seal assembly are isolated from fluid flow through the regulator to enhance seal life and reliability.

3. The regulator of claim 1 wherein fluid flow through the regulator moves away from the supply seal assembly and the vent seal assembly with increasing change in pressure and the supply seal assembly and the vent seal assembly seal surfaces are isolated from fluid flow during high fluid flow through the regulator to enhance seal life and reliability.

4. The regulator of claim 1 wherein the supply seal assembly and the vent seal assembly are isolated from high fluid flow through the regulator to enhance seal life and reliability.

5. The regulator of claim 1 wherein the supply seal assembly and the vent seal assembly are isolated from direct fluid flow when fluid flow through the regulator is from about 2 gpm or higher.

6. The regulator of claim 1 wherein the body is segmented.

7. The regulator of claim 1 wherein the body is unitized.

8. The regulator of claim 1 further including an auxiliary vent passageway in the body to convey fluid from the regulated port to the lower flow passageway in the control stem when the control stem is in the vent position.

9. The regulator of claim 8 wherein the control stem includes a plurality of inlet holes and outlet holes in communication with the upper flow passageway allowing fluid to pass from the supply port, through the inlet holes, the upper flow passageway in the control stem, the outlet holes to the regulated port when the control stem is in the open position.

10. The regulator of claim 9 wherein the control stem further includes a plurality of vent holes and an outlet aperture in communication with the lower flow passageway allowing fluid to pass from the regulated port through the auxiliary vent passageway, the vent holes, the lower flow passageway in the control stem and the outlet aperture to the vent port when the control stem is in the vent position.

11. The regulator of claim 1 wherein the supply seal assembly includes a c-shaped ring and an o-ring positioned in an open section of the c-shaped ring, the open section positioned towards the control knob.

12. The regulator of claim 11 wherein the vent seal assembly includes a c-shaped ring and an o-ring positioned in an open section of the c-shaped ring, the open section positioned away from the control knob.

13. A regulator with erosion resistant seal assemblies, the regulator connected to a pressurized fluid supply, a downstream apparatus and a vent, the regulator comprising:
   a body having a supply port, a regulated port and a vent port, the supply port connected to the pressurized fluid supply, the regulated port connected to the downstream apparatus and the vent port open to atmospheric pressure;
   an axial opening in the body for an elongate control stem;
   a control stem operatively connected to an external adjustment knob to adjust the relative position of the control stem and a sensor piston to adjust a set point of the regulator, the control stem having a closed position in which no fluid flows through the regulator, an open position in which fluid flows from the supply port through the control stem to the regulated port and a vent position in which fluid flows from the regulated port through the control stem to the vent port;
   the control stem having a central shaft with an upper flow passageway proximate a supply seal assembly, and a lower flow passageway proximate a vent seal assembly, the control stem concurrently sealing against the supply seal assembly and the vent seal assembly to prevent fluid flow through the regulator when the control stem is in the closed position;
   the control stem being operatively connected to a sensor piston which is exposed to pressurized fluid in the regulated port to move the control stem when fluid pressure in the regulated port falls below the set pressure to disengage the upper flow passageway from the supply seal assembly to allow fluid to flow from the supply port through the upper flow passageway in the control stem to the regulated port when the control stem is in the open position, the supply seal assembly is further removed from fluid flow with increasing chance in pressure when the control stem is in the open position; and
   the control stem being operatively connected to the sensor piston which is exposed to pressurized fluid in the regulated port to move the control stem when fluid pressure in the regulated port exceeds the set pressure to disengage the lower flow passageway from the vent seal assembly to allow fluid to flow from the regulated port through the lower flow passageway in the control stem to the vent port when the control stem is in the vent position, the vent seal assembly is further removed from fluid flow with increasing change in pressure when the control stem is in the vent position.

14. The regulator of claim 10 wherein the body is segmented.

15. The regulator of claim 10 wherein the body is unitized.

16. The regulator of claim 10 further including an auxiliary vent passageway in the body to convey fluid from the regulated port to the lower flow passageway in the control stem when the control stem is in the vent position.

17. The regulator of claim 13 wherein the control stem includes a plurality of inlet holes and outlet holes in communication with the upper flow passageway allowing fluid to pass from the supply port, through the inlet holes, the upper flow passageway in the control stem, the outlet holes to the regulated port when the control stem is in the open position.

18. The regulator of claim 14 wherein the control stem further includes a plurality of vent holes and an outlet aperture in communication with the lower flow passageway allowing fluid to pass from the regulated port through the auxiliary vent passageway, the vent holes the lower flow passageway in the control stem and the outlet aperture to the vent port when the control stem is in the vent position.

19. The regulator of claim 10 wherein the supply seal assembly includes a c-shaped ring and an o-ring positioned in an open section of the c-shaped ring, the open section positioned towards the control knob.

20. The regulator of claim 16 wherein the vent seal assembly includes a c-shaped ring and an o-ring positioned in an open section of the c-shaped ring, the open section positioned away from the control knob.

21. A flow control regulator with erosion resistant seal assemblies, the regulator comprising:
   a body having a supply port, a regulated port and a vent port;
   an axial opening in the body for movably receiving a control stem therein;
   the control stem operatively connected to a device to adjust a set point of the regulator, the control stem having a closed position in which no fluid flows through the regulator, an open position in which fluid flows from the supply port through the control stem to the regulated port and a vent position in which fluid flows from the regulated port through the control stern to the vent port;
   the control stem having a first portion with an internal first flow passageway with an exterior of the first portion sealingly engaging a supply seal assembly, and having a second portion with an internal second flow passageway with an exterior of the second portion sealingly engaging a vent seal assembly, the control stem concurrently sealing against the supply seal assembly and the vent seal assembly to prevent fluid flow through the regulator when the control stem is in the closed position, said control stem including third and fourth flow passageways forming flow paths between the first flow passageway and the exterior of the control stem;
   the control stem being operatively associated with a sensor member which when exposed to pressurized fluid in the regulated port is operable to move the control stem when fluid pressure in the regulated port falls below the set pressure to connect the supply port to the regulated port through the first flow passageway to allow fluid to flow from the supply port through the first, third and fourth flow passageways in the control stem to the regulated port when the control stem is in the open position while preventing fluid flow past the supply seal assembly; and the control stem being operatively associated with the sensor piston which when exposed to pressurized fluid in the regulated port being operable to move the control stem when fluid pressure in the regulated port exceeds the set pressure to connect the second flow passageway to the vent port to allow fluid to flow from the regulated port through the second flow passageway in the control stem to the vent port when the control stem is in the vent position.

22. The regulator of claim 21 wherein the supply seal assembly and the vent seal assembly are isolated from fluid flow through the regulator to enhance seal life and reliability.

23. The regulator of claim 21 wherein the fluid flow through the regulator moves away from the supply seal assembly and the vent seal assembly with increasing change in pressure and the supply seal assembly and the vent seal assembly seal surfaces are isolated from fluid flow during high fluid flow through the regulator to enhance seal life and reliability.

24. The regulator of claim 21 wherein the supply seal assembly and the vent seal assembly are isolated from direct fluid flow when fluid flow through the regulator is from about 2 gpm or higher.

25. The regulator of claim 21 further including an auxiliary vent passageway in the body to convey fluid from the regulated port to the lower flow passageway in the control stem when the control stem is in the vent position.

26. The regulator of claim 25 wherein the third passageway includes a plurality of inlet holes and the fourth passageway includes a plurality of outlet holes in communication with the first flow passageway allowing fluid to pass from the supply port, through the inlet holes, the first flow passageway in the control stem and the outlet holes to the regulated port when the control stem is in the open position.

27. The regulator of claim 26 wherein the control stem further includes a plurality of vent holes and an outlet aperture in communication with the second flow passageway allowing fluid to pass from the regulated port through the auxiliary vent passageway, the vent holes, the second flow passageway in the control stem and the outlet aperture to the vent port when the control stem is in the vent position.

28. The regulator of claim 21 wherein the supply seal assembly includes a c-shaped ring and an o-ring positioned in an open section of the c-shaped ring, the open section positioned towards the device.

29. The regulator of claim 28 wherein the vent seal assembly includes a c-shaped ring and an o-ring positioned in an open section of the c-shaped ring, the open section positioned away from the device.

* * * * *

UNITED STATES PATENT AND TRADEMARK OFFICE
CERTIFICATE OF CORRECTION

PATENT NO. : 6,843,266 B2
DATED : January 18, 2005
INVENTOR(S) : Rodney C. Hope et al.

It is certified that error appears in the above-identified patent and that said Letters Patent is hereby corrected as shown below:

Title page,
Item [*] Notice, insert -- This patent is subject to a terminal disclaimer. --
Item [57], ABSTRACT,
Line 11, after the word "partially" insert -- contained --

Column 7,
Line 49, delete "6Z" and replace with -- 62 --

Column 14,
Line 6, delete the phrase "upward. It" and replace with -- upward, it --
Line 36, after the phrase "longitudal bore" insert -- 2020 --

Column 20,
Line 50, delete "stern" and replace with -- stem --

Signed and Sealed this

Tenth Day of May, 2005

JON W. DUDAS
*Director of the United States Patent and Trademark Office*